(12) United States Patent
Yang et al.

(10) Patent No.: US 10,735,498 B2
(45) Date of Patent: Aug. 4, 2020

(54) METHOD AND DEVICE FOR INTERWORKING BETWEEN DIFFERENT OTTS

(71) Applicant: Huawei Technologies Co., Ltd., Shenzhen (CN)

(72) Inventors: Yanmei Yang, Beijing (CN); Lei Wan, Beijing (CN); De Chen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 632 days.

(21) Appl. No.: 15/013,693

(22) Filed: Feb. 2, 2016

(65) Prior Publication Data

US 2016/0156703 A1 Jun. 2, 2016

Related U.S. Application Data

(63) Continuation of application No. PCT/CN2014/083423, filed on Jul. 31, 2014.

(30) Foreign Application Priority Data

Aug. 2, 2013 (CN) .......................... 2013 1 0334854

(51) Int. Cl.
*H04L 12/58* (2006.01)
*H04L 29/08* (2006.01)
*H04N 21/258* (2011.01)
*H04N 21/61* (2011.01)
*H04N 21/2668* (2011.01)
*H04L 29/06* (2006.01)

(52) U.S. Cl.
CPC ............... *H04L 67/10* (2013.01); *H04L 51/32* (2013.01); *H04L 63/104* (2013.01); *H04N 21/25891* (2013.01); *H04N 21/2668* (2013.01); *H04N 21/6125* (2013.01); *H04L 51/36* (2013.01)

(58) Field of Classification Search
CPC .......... H04L 51/32; H04L 51/36; H04L 67/10
See application file for complete search history.

(56) References Cited

U.S. PATENT DOCUMENTS

| | | | | |
|---|---|---|---|---|
| 9,288,122 B1 * | 3/2016 | Zhang | ................... | G06F 16/955 |
| 2012/0198358 A1 * | 8/2012 | Carrer | ................... | G06Q 10/10 |
| | | | | 715/753 |
| 2013/0036177 A1 * | 2/2013 | Leeder | ................. | G06Q 10/107 |
| | | | | 709/206 |
| 2013/0040633 A1 * | 2/2013 | Leeder | ................... | H04W 4/60 |
| | | | | 455/422.1 |

(Continued)

FOREIGN PATENT DOCUMENTS

| | | |
|---|---|---|
| CN | 101237426 A | 8/2008 |
| CN | 101242374 A | 8/2008 |

(Continued)

*Primary Examiner* — Jeong S Park
(74) *Attorney, Agent, or Firm* — Slater Matsil, LLP

(57) ABSTRACT

Embodiments provide a method and a device for interworking between different OTTs. The method includes: obtaining OTT information of a target user; and performing an interworking processing operation between cross-OTT friends according to the obtained OTT information of the target user. Interworking between the cross-OTT friends is implemented by using the foregoing operation.

19 Claims, 9 Drawing Sheets

(56) References Cited

U.S. PATENT DOCUMENTS

| | | | | |
|---|---|---|---|---|
| 2013/0080538 A1* | 3/2013 | McEachern | ............. | H04L 51/32 |
| | | | | 709/206 |
| 2013/0304830 A1* | 11/2013 | Olsen | ...................... | H04L 51/32 |
| | | | | 709/206 |
| 2014/0068692 A1* | 3/2014 | Archibong | ....... | H04N 21/25866 |
| | | | | 725/116 |
| 2014/0122616 A1* | 5/2014 | Shang | ..................... | H04L 51/32 |
| | | | | 709/206 |
| 2014/0310346 A1* | 10/2014 | Deng | ..................... | H04L 67/22 |
| | | | | 709/204 |

FOREIGN PATENT DOCUMENTS

| | | |
|---|---|---|
| CN | 101778053 A | 7/2010 |
| CN | 102694742 A | 9/2012 |
| EP | 2178252 A1 | 4/2010 |

\* cited by examiner

Online users who add the user A as a friend

Online users who add the user A as a friend

METHOD AND DEVICE FOR INTERWORKING BETWEEN DIFFERENT OTTS

This application is a continuation of International Application No. PCT/CN2014/083423, filed on Jul. 31, 2014, which claims priority to Chinese Patent Application No. 201310334854.9, filed on Aug. 2, 2013, both of which are hereby incorporated by reference in their entireties.

TECHNICAL FIELD

The present invention relates to communications technologies, and in particular, to a method and a device for interworking between different OTTs.

BACKGROUND

OTT, an abbreviation for "over the top", refers to a technology that enables Internet enterprises to develop their own services, such as Google, Apple, Skype, and Netflix in other countries, and QQ in China, by using a broadband network of an operator. Both Netflix network videos and applications in various mobile application stores are OTT services.

With an increasing growth of the OTT services, a technology is required to implement interaction between different OTT services. An existing related method is displaying account numbers of all OTT services of a user in a unified interface, and the user needs to log in to all OTT account numbers, so as to communicate with a friend within a same OTT by using the interface, which however cannot actually implement interaction between different OTT services. For example, when logging in to an OTT A service by using the interface, the user can only interact with a friend within the OTT A service, but cannot interact with a user within an OTT B service. Another existing method related to interaction between different OTT services is establishing another friendship within another OTT service for two users who are in a friendship within a same OTT service. However, establishment of a friendship is still limited within a same OTT, and interaction between different OTT services is not actually implemented either.

SUMMARY

In view of this, embodiments provide a method and a device for interworking between different OTTs, so as to implement interworking between cross-OTT friends.

According to a first aspect, an embodiment of the present invention provides a method for interworking between different OTTs, including: obtaining OTT information of a target user; and performing an interworking processing operation between cross-OTT friends according to the obtained OTT information of the target user.

With reference to the first aspect, in a first possible implementation manner of the first aspect, the obtaining OTT information of a target user includes: obtaining the OTT information of the target user according to at least one association relationship of an association relationship between intra-OTT friends of an OTT user and an association relationship between cross-OTT friends of the OTT user; and the performing an interworking processing operation between cross-OTT friends according to the obtained OTT information of the target user includes: sending, by using a push message, the OTT information of the target user to the OTT user or an OTT server that the OTT user logs in to, where the OTT information of the target user is used for recommending a new cross-OTT friend or a new intra-OTT friend to the OTT user; or the obtaining OTT information of a target user includes: obtaining online status information of the target user; and the performing an interworking processing operation between cross-OTT friends according to the obtained OTT information of the target user includes: sending the online status information of the target user to a user who takes the target user as a cross-OTT friend; or sending the online status information of the target user to an OTT server that a user who takes the target user as a cross-OTT friend logs in to.

With reference to the first possible implementation manner of the first aspect, in a second possible implementation manner of the first aspect, the obtaining online status information of the target user includes: obtaining go-online information or go-offline information of the target user; or obtaining go-online information of the target user and information about an OTT that the target user logs in to; or obtaining offline information of the target user and information about an OTT that the target user logs in to.

With reference to the first aspect, in a third possible implementation manner of the first aspect, before the obtaining OTT information of a target user, the method further includes: receiving a cross-OTT service request of an OTT user, where the cross-OTT service request carries information about the target user; and the obtaining OTT information of a target user includes: obtaining the OTT information of the target user according to the information about the target user, where the OTT information includes an OTT account number.

With reference to the third possible implementation manner of the first aspect, in a fourth possible implementation manner of the first aspect, the cross-OTT service request is a request for adding a cross-OTT friend, where the information about the target user includes information about a user to be added as a cross-OTT friend; the obtaining OTT information of a target user includes: obtaining, according to the information about the user to be added as a cross-OTT friend, OTT account information of the user to be added as a cross-OTT friend; and the performing an interworking processing operation between cross-OTT friends according to the obtained OTT information of the target user includes: adding, into an OTT friend list of the OTT user according to the obtained OTT account information of the user to be added as a cross-OTT friend, an OTT account number of the user to be added as a cross-OTT friend.

With reference to the fourth possible implementation manner of the first aspect, in a fifth possible implementation manner of the first aspect, before the receiving a cross-OTT service request of an OTT user, the method further includes: receiving a query request of the OTT user, where the query request is used to query the OTT account information of the user to be added as a cross-OTT friend; obtaining, according to the query request, the OTT account information of the user to be added as a cross-OTT friend; and sending, to the OTT user or a server that the OTT user logs in to, the obtained OTT account information of the user to be added as a cross-OTT friend.

With reference to the fourth or the fifth possible implementation manner of the first aspect, in a sixth possible implementation manner of the first aspect, before the adding, into an OTT friend list of the OTT user, an OTT account number of the user to be added as a cross-OTT friend, the method further includes: sending, to the OTT user or an OTT server that the OTT user logs in to, the OTT account information of the user to be added as a cross-OTT friend;

receiving acknowledgment information returned by the OTT user or the OTT server that the OTT user logs in to, where the acknowledgment information includes information for adding, as friends, all or some OTT account numbers of the user to be added as a cross-OTT friend; and adding, into the OTT friend list of the OTT user according to the information for adding, as friends, all or some OTT account numbers of the user to be added as a cross-OTT friend, all or some OTT account numbers of the user to be added as a cross-OTT friend.

With reference to the third possible implementation manner of the first aspect, in a seventh possible implementation manner of the first aspect, the cross-OTT service request is a cross-OTT communication request, and the information about the target user is information about a peer user with whom the OTT user requests to perform cross-OTT communication; the obtaining OTT information of a target user includes: obtaining, according to the information about the peer user with whom the OTT user requests to perform the cross-OTT communication, OTT account information of the peer user with whom the OTT user requests to perform the cross-OTT communication; and according to the obtained OTT information of the target user includes: acquiring, according to the obtained OTT account information of the peer user with whom the OTT user requests to perform the cross-OTT communication, information about an OTT server that the peer user with whom the OTT user requests to perform the cross-OTT communication currently logs in to; and sending, according to the obtained information about the OTT server, the communication request to the OTT server that the peer user with whom the OTT user requests to perform the cross-OTT communication currently logs in to or an OTT interworking platform client used for a login of the peer user with whom the OTT user requests to perform the cross-OTT communication, so as to implement the cross-OTT communication.

With reference to the first aspect, in an eighth possible implementation manner of the first aspect, before the obtaining OTT information of a target user, the method further includes: receiving shared information that is posted by an OTT user and by using an OTT client; the obtaining OTT information of a target user includes: obtaining status information of a user who takes the OTT user as a cross-OTT friend; and the performing an interworking processing operation between cross-OTT friends according to the obtained OTT information of the target user includes: sending, according to the obtained status information by using a push message or in an active request manner, the received shared information to an OTT client used for a login of the user who takes the OTT user as a cross-OTT friend; or sending, according to the obtained status information by using a push message or in an active request manner, the received shared information to an OTT server that the user who takes the OTT user as a cross-OTT friend logs in to, so that the OTT server sends the shared information to an OTT client of the user who takes the OTT user as a cross-OTT friend.

With reference to the third possible implementation manner of the first aspect, in a ninth possible implementation manner of the first aspect, the receiving a cross-OTT service request of an OTT user includes: receiving a request of the OTT user for acquiring OTT information of a friend of the OTT user, where the information about the target user is information about the friend of the OTT user; the obtaining OTT information of a target user includes: obtaining the OTT information of the friend of the OTT user according to the information about the friend of the OTT user; and the performing an interworking processing operation between cross-OTT friends according to the obtained OTT information of the target user includes: sending the obtained OTT information of the friend of the OTT user to the OTT user; or sending the obtained OTT information of the friend of the OTT user to an OTT server that the OTT user logs in to.

With reference to the third possible implementation manner of the first aspect, in a tenth possible implementation manner of the first aspect, the receiving a cross-OTT service request of an OTT user includes: receiving a request of an OTT server that the OTT user logs in to, where the request is used to obtain OTT information of receiving user of shared information sent by the OTT user, where the information about the target user is the OTT information of the receiving user; and the performing an interworking processing operation between cross-OTT friends according to the obtained OTT information of the target user includes: sending the obtained OTT information of the receiving user to the OTT server that the OTT user logs in to.

With reference to the third possible implementation manner of the first aspect, in an eleventh possible implementation manner of the first aspect, the receiving a cross-OTT service request of an OTT user includes: receiving a request of the OTT user for establishing a cross-OTT communication group, where the information about the target user is information about all OTT users who are requested to join the cross-OTT communication group; the obtaining OTT information of a target user includes: obtaining, according to the information of the OTT users who are requested to join the cross-OTT communication group, OTT information of all the OTT users who are requested to join the group; the performing an interworking processing operation between cross-OTT friends according to the OTT information of the target user includes: establishing the cross-OTT communication group of the OTT user according to the obtained OTT information of all the OTT users who are requested to join the cross-OTT communication group, and sending group establishment information to all the OTT users in the communication group or OTT servers that all the OTT users separately log in to.

With reference to the tenth possible implementation manner of the first aspect, in a twelfth possible implementation manner of the first aspect, the received request for establishing the cross-OTT communication group further carries a name of the cross-OTT communication group that the OTT user requests to establish.

With reference to the twelfth possible implementation manner of the first aspect, in a thirteenth possible implementation manner of the first aspect, the establishing the cross-OTT communication group of the OTT user according to the obtained OTT information of all the OTT users who are requested to join the cross-OTT communication group includes: saving the name of the cross-OTT communication group that the OTT user requests to establish, and information about all members in the cross-OTT communication group.

With reference to the third possible implementation manner of the first aspect, in a fourteenth possible implementation manner of the first aspect, the receiving a cross-OTT service request of an OTT user includes: receiving the cross-OTT service request of the OTT user by using an OTT server or an OTT interworking platform client.

According to a second aspect, an embodiment provides a method for interworking between different OTTs, including: receiving interworking information of a cross-OTT friend that is sent by an OTT interworking platform server or an OTT server; and displaying the received interworking information of the cross-OTT friend.

With reference to the second aspect, in a first possible implementation manner of the second aspect, before the receiving interworking information of a cross-OTT friend that is sent by an OTT interworking platform server or an OTT server, the method further includes: sending a cross-OTT service request to the OTT interworking platform server or the OTT server, so that the OTT interworking platform server or the OTT server returns the interworking information of the cross-OTT friend according to the cross-OTT service request.

With reference to the first possible implementation manner of the second aspect, in a second possible implementation manner of the second aspect, the cross-OTT service request is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group. The interworking information of the cross-OTT friend is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend. The displaying the received interworking information of the cross-OTT friend includes: displaying the information for recommending the cross-OTT friend, the online status information of the cross-OTT friend, the OTT information of a user to be added as a cross-OTT friend, the shared information that is posted by the cross-OTT friend, the OTT information of a friend of an OTT user, the information about an OTT user who is allowed to receive the shared information sent by the OTT user, or information about the cross-OTT communication group.

With reference to the second possible implementation manner of the second aspect, in a third possible implementation manner of the second aspect, after the displaying the OTT information of a user to be added as a cross-OTT friend, the method further includes: sending acknowledgment information of the user to the OTT interworking platform server or the OTT server.

According to a third aspect, an embodiment provides a method for interworking between different OTTs, including: receiving interworking information of a cross-OTT friend that is sent by an OTT interworking platform server; and sending the received cross-OTT interworking information to a corresponding OTT client.

With reference to the third aspect, in a first possible implementation manner of the third aspect, before the receiving interworking information of a cross-OTT friend that is sent by an OTT interworking platform server, the method further includes: receiving a cross-OTT service request sent by the OTT client; and sending the received cross-OTT service request to the OTT interworking platform server, so that the OTT interworking platform server returns the interworking information of the cross-OTT friend according to the cross-OTT service request.

With reference to the first possible implementation manner of the third aspect, in a second possible implementation manner of the third aspect, the cross-OTT service request is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group; and the interworking information of the cross-OTT friend is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend.

With reference to the second possible implementation manner of the third aspect, in a third possible implementation manner of the third aspect, after the sending the received cross-OTT interworking information to a corresponding OTT client, the method further includes: receiving acknowledgment information of the OTT user that is sent by the OTT client; and sending the received acknowledgment information to the OTT interworking platform server.

According to a fourth aspect, an embodiment provides an OTT interworking platform server. The server includes an information processing module, configured to obtain OTT information of a target user; and a communication module, configured to perform an interworking processing operation between cross-OTT friends according to the OTT information of the target user that is obtained by the information processing module.

With reference to the fourth aspect, in a first possible implementation manner of the fourth aspect, the information processing module is specifically configured to obtain the OTT information of the target user according to at least one association relationship of an association relationship between intra-OTT friends of an OTT user and an association relationship between cross-OTT friends of the OTT user; and the communication module is specifically configured to send, by using a push message, the OTT information of the target user that is obtained by the information processing module to the OTT user or an OTT server that the OTT user logs in to, where the OTT information of the target user is used for recommending a new cross-OTT friend or a new intra-OTT friend to the OTT user. Or, the information processing module is specifically configured to obtain online status information of the target user; and the communication module is specifically configured to: send the online status information of the target user that is obtained by the information processing module to a user who takes the target user as a cross-OTT friend; or send the online status information of the target user that is obtained by the information processing module to an OTT server that a user who takes the target user as a cross-OTT friend logs in to.

With reference to the first possible implementation manner of the fourth aspect, in a second possible implementation manner of the fourth aspect, the information processing module is specifically configured to: obtain go-online information or go-offline information of the target user; or obtain go-online information of the target user and information about an OTT that the target user logs in to; or obtain offline information of the target user and information about an OTT that the target user logs in to.

With reference to the fourth aspect, in a third possible implementation manner of the fourth aspect, the communication module is further configured to: before the information processing module obtains the OTT information of the target user, receive a cross-OTT service request of an OTT user, where the cross-OTT service request carries information about the target user; and the information processing module is specifically configured to obtain the OTT information of the target user according to the information about the target user, where the OTT information includes an OTT account number.

With reference to the third possible implementation manner of the fourth aspect, in a fourth possible implementation manner of the fourth aspect, the cross-OTT service request received by the communication module is a request for adding a cross-OTT friend, where the information about the target user includes information about a user to be added as a cross-OTT friend; the information processing module is specifically configured to obtain, according to the information about the user to be added as a cross-OTT friend, OTT account information of the user to be added as a cross-OTT friend; and the performing an interworking processing operation between cross-OTT friends according to the obtained OTT information of the target user includes: adding, into an OTT friend list of the OTT user according to the obtained OTT account information of the user to be added as a cross-OTT friend, an OTT account number of the user to be added as a cross-OTT friend.

With reference to the fourth possible implementation manner of the fourth aspect, in a fifth possible implementation manner of the fourth aspect, the communication module is further configured to: before receiving the cross-OTT service request of the OTT user, receive a query request of the OTT user, where the query request is used to query the OTT account information of the user to be added as a cross-OTT friend; the information processing module is further configured to obtain, according to the query request, the OTT account information of the user to be added as a cross-OTT friend; and the communication module is further configured to send, to the OTT user or a server that the OTT user logs in to, the obtained OTT account information of the user to be added as a cross-OTT friend.

With reference to the fourth or the fifth possible implementation manner of the fourth aspect, in a sixth possible implementation manner of the fourth aspect, the communication module is further configured to: before the information processing module adds, into the OTT friend list of the OTT user, the OTT account number of the user to be added as a cross-OTT friend, send, to the OTT user or an OTT server that the OTT user logs in to, the OTT account information of the user to be added as a cross-OTT friend; receive acknowledgment information returned by the OTT user or the OTT server that the OTT user logs in to, where the acknowledgment information includes information for adding, as friends, all or some OTT account numbers of the user to be added as a cross-OTT friend; and add, into the OTT friend list of the OTT user according to the information for adding, as friends, all or some OTT account numbers of the user to be added as a cross-OTT friend, all or some OTT account numbers of the user to be added as a cross-OTT friend.

With reference to the third possible implementation manner of the fourth aspect, in a seventh possible implementation manner of the fourth aspect, the cross-OTT service request received by the communication module is a cross-OTT communication request, and the information about the target user is information about a peer user with whom the OTT user requests to perform cross-OTT communication; the information processing module is specifically configured to: obtain, according to the information about the peer user with whom the OTT user requests to perform the cross-OTT communication, OTT account information of the peer user with whom the OTT user requests to perform the cross-OTT communication; and acquire, according to the obtained OTT account information of the peer user with whom the OTT user requests to perform the cross-OTT communication, information about an OTT server that the peer user with whom the OTT user requests to perform the cross-OTT communication currently logs in to; and the communication module is further configured to send, according to the obtained information about the OTT server, the communication request to the OTT server that the peer user with whom the OTT user requests to perform the cross-OTT communication currently logs in to or an OTT interworking platform client used for a login of the peer user with whom the OTT user requests to perform the cross-OTT communication, so as to implement the cross-OTT communication.

With reference to the fourth aspect, in an eighth possible implementation manner of the fourth aspect, the communication module is further configured to: before the information processing module obtains the OTT information of the target user, receive shared information that is posted by an OTT user and by using an OTT client; the information processing module is specifically configured to: obtain status information of a user who takes the OTT user as a cross-OTT friend. The communication module is further configured to: send, according to the obtained status information by using a push message or in an active request manner, the received shared information to an OTT client used for a login of the user who takes the OTT user as a cross-OTT friend; or send, according to the obtained status information by using a push message or in an active request manner, the received shared information to an OTT server that the user who takes the OTT user as a cross-OTT friend logs in to, so that the OTT server sends the shared information to an OTT client of the user who takes the OTT user as a cross-OTT friend.

With reference to the third possible implementation manner of the fourth aspect, in a ninth possible implementation manner of the fourth aspect, the communication module is specifically configured to receive a request of the OTT user for acquiring OTT information of a friend of the OTT user, where the information about the target user is information about the friend of the OTT user; the information processing module is specifically configured to obtain the OTT information of the friend of the OTT user according to the information about the friend of the OTT user; and the communication module is further configured to: send the obtained OTT information of the friend of the OTT user to the OTT user; or send the obtained OTT information of the friend of the OTT user to an OTT server that the OTT user logs in to.

With reference to the third possible implementation manner of the fourth aspect, in a tenth possible implementation manner of the fourth aspect, the communication module is specifically configured to receive a request of an OTT server that the OTT user logs in to, where the request is used to obtain OTT information of a receiving user of shared information sent by the OTT user, where the information about the target user is the OTT information of the receiving user; and the communication module is further configured to send the obtained OTT information of the receiving user to the OTT server that the OTT user logs in to.

With reference to the third possible implementation manner of the fourth aspect, in an eleventh possible implementation manner of the fourth aspect, the communication module is specifically configured to receive a request of the OTT user for establishing a cross-OTT communication group, where the information about the target user is information about all OTT users who are requested to join the cross-OTT communication group; the information processing module is specifically configured to: obtain, according to the information of the OTT users who are requested to join the cross-OTT communication group, OTT information of all the OTT users who are requested to join the group; and establish the cross-OTT communication group of the OTT user according to the obtained OTT information of all the OTT users who are requested to join the cross-OTT communication group; and the communication module is further configured to send group establishment information to all the OTT users in the communication group or OTT servers that all the OTT users separately log in to.

With reference to the tenth possible implementation manner of the fourth aspect, in a twelfth possible implementation manner of the fourth aspect, the request that is for establishing the cross-OTT communication group and received by the communication module further carries a name of the cross-OTT communication group that the OTT user requests to establish.

With reference to the twelfth possible implementation manner of the fourth aspect, in a thirteenth possible implementation manner of the fourth aspect, the information processing module is specifically configured to: save the name of the cross-OTT communication group that the OTT user requests to establish, and information about all members in the cross-OTT communication group.

With reference to the third possible implementation manner of the fourth aspect, in a fourteenth possible implementation manner of the fourth aspect, the communication module is specifically configured to receive the cross-OTT service request of the OTT user by using an OTT server or an OTT interworking platform client.

According to a fifth aspect, an embodiment of the present invention provides an apparatus for interworking between different OTTs, including: a communication module, configured to receive interworking information of a cross-OTT friend that is sent by an OTT interworking platform server or an OTT server; and a display module, configured to display the interworking information of the cross-OTT friend that is received by the communication module.

With reference to the fifth aspect, in a first possible implementation manner of the fifth aspect, the communication module is further configured to: before receiving the interworking information of the cross-OTT friend that is sent by the OTT interworking platform server or the OTT server, send a cross-OTT service request to the OTT interworking platform server or the OTT server, so that the OTT interworking platform server or the OTT server returns the interworking information of the cross-OTT friend according to cross-OTT service request.

With reference to the first possible implementation manner of the fifth aspect, in a second possible implementation manner of the fifth aspect, the cross-OTT service request received by the communication module is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group; the interworking information of the cross-OTT friend that is received by the communication module is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend; and the display module is specifically configured to display the information for recommending the cross-OTT friend, the online status information of the cross-OTT friend, the OTT information of a user to be added as a cross-OTT friend, the shared information that is posted by the cross-OTT friend, the OTT information of a friend of an OTT user, the information about an OTT user who is allowed to receive the shared information sent by the OTT user, the result of establishing the cross-OTT communication group, or the result of adding the cross-OTT friend.

With reference to the second possible implementation manner of the fifth aspect, in a third possible implementation manner of the fifth aspect, the communication module is further configured to: after the display module displays the OTT information of a user to be added as a cross-OTT friend, send acknowledgment information of the user to the OTT interworking platform server or the OTT server.

With reference to the fifth aspect or any one of the first to the third possible implementation manners of the fifth aspect, in a fourth possible implementation manner of the fifth aspect, the apparatus is an OTT client or an OTT interworking platform client.

According to a sixth aspect, an embodiment provides an OTT server, including: a server communication module, configured to receive interworking information of a cross-OTT friend that is sent by an OTT interworking platform server; and a client communication module, configured to send the cross-OTT interworking information received by the server communication module to a corresponding OTT client.

With reference to the sixth aspect, in a first possible implementation manner of the sixth aspect, the client communication module is further configured to: before the server communication module receives the interworking information of the cross-OTT friend that is sent by the OTT interworking platform server, receive a cross-OTT service request sent by the OTT client; and the server communication module is further configured to send the cross-OTT service request received by the client communication module to the OTT interworking platform server, so that the OTT interworking platform server returns the interworking information of the cross-OTT friend according to the cross-OTT service request.

With reference to the first possible implementation manner of the sixth aspect, in a second possible implementation manner of the sixth aspect, the cross-OTT service request received by the client communication module is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group; and the interworking information of the cross-OTT friend that is received by the server communication module is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend.

With reference to the second possible implementation manner of the sixth aspect, in a third possible implementation manner of the sixth aspect, the client communication module is further configured to: after sending the received cross-OTT interworking information to the corresponding OTT client, receive acknowledgment information of the OTT user that is sent by the OTT client; and the server communication module is further configured to send the received acknowledgment information to the OTT interworking platform server.

According to a seventh aspect, an embodiment of the present invention provides an OTT interworking platform server, including: a processor, configured to obtain OTT information of a target user; and a transceiver, configured to perform an interworking processing operation between cross-OTT friends according to the OTT information of the target user that is obtained by the processor.

With reference to the seventh aspect, in a first possible implementation manner of the seventh aspect, the processor is specifically configured to obtain the OTT information of the target user according to at least one association relationship of an association relationship between intra-OTT friends of an OTT user and an association relationship between cross-OTT friends of the OTT user; and the transceiver is specifically configured to send, by using a push message, the OTT information of the target user that is obtained by the processor to the OTT user or an OTT server that the OTT user logs in to, where the OTT information of the target user is used for recommending a new cross-OTT friend or a new intra-OTT friend to the OTT user; or the processor is specifically configured to obtain online status information of the target user. The transceiver is specifically configured to: send the online status information of the target user that is obtained by the processor to a user who takes the target user as a cross-OTT friend; or send the online status information of the target user that is obtained by the processor to an OTT server that a user who takes the target user as a cross-OTT friend logs in to.

With reference to the first possible implementation manner of the seventh aspect, in a second possible implementation manner of the seventh aspect, the processor is specifically configured to: obtain go-online information or go-offline information of the target user; or obtain go-online information of the target user and information about an OTT that the target user logs in to; or obtain offline information of the target user and information about an OTT that the target user logs in to.

With reference to the seventh aspect, in a third possible implementation manner of the seventh aspect, the transceiver is further configured to: before the processor obtains the OTT information of the target user, receive a cross-OTT service request of an OTT user, where the cross-OTT service request carries information about the target user. The processor is specifically configured to obtain the OTT information of the target user according to the information about the target user, where the OTT information includes an OTT account number.

With reference to the third possible implementation manner of the seventh aspect, in a fourth possible implementation manner of the seventh aspect, the cross-OTT service request received by the transceiver is a request for adding a cross-OTT friend, where the information about the target user includes information about a user to be added as a cross-OTT friend; the processor is specifically configured to obtain, according to the information about the user to be added as a cross-OTT friend, OTT account information of the user to be added as a cross-OTT friend; and the transceiver is specifically configured to add into an OTT friend list of the OTT user according to the obtained OTT account information of the user to be added as a cross-OTT friend, an OTT account number of the user to be added as a cross-OTT friend.

With reference to the fourth possible implementation manner of the seventh aspect, in a fifth possible implementation manner of the seventh aspect, the transceiver is further configured to: before receiving the cross-OTT service request of the OTT user, receive a query request of the OTT user, where the query request is used to query the OTT account information of the user to be added as a cross-OTT friend; the processor is further configured to obtain, according to the query request, the OTT account information of the user to be added as a cross-OTT friend; and the transceiver is further configured to send, to the OTT user or a server that the OTT user logs in to, the obtained OTT account information of the user to be added as a cross-OTT friend.

With reference to the fourth or the fifth possible implementation manner of the seventh aspect, in a sixth possible implementation manner of the seventh aspect, the transceiver is further configured to: before the processor adds, into the OTT friend list of the OTT user, the OTT account number of the user to be added as a cross-OTT friend, send, to the OTT user or an OTT server that the OTT user logs in to, the OTT account information of the user to be added as a cross-OTT friend; receive acknowledgment information returned by the OTT user or the OTT server that the OTT user logs in to, where the acknowledgment information includes information for adding, as friends, all or some OTT account numbers of the user to be added as a cross-OTT friend; and add, into the OTT friend list of the OTT user according to the information for adding, as friends, all or some OTT account numbers of the user to be added as a cross-OTT friend, all or some OTT account numbers of the user to be added as a cross-OTT friend.

With reference to the third possible implementation manner of the seventh aspect, in a seventh possible implementation manner of the seventh aspect, the cross-OTT service request received by the transceiver is a cross-OTT communication request, and the information about the target user is information about a peer user with whom the OTT user requests to perform cross-OTT communication; the processor is specifically configured to: obtain, according to the information about the peer user with whom the OTT user requests to perform the cross-OTT communication, OTT account information of the peer user with whom the OTT user requests to perform the cross-OTT communication; and acquire, according to the obtained OTT account information of the peer user with whom the OTT user requests to perform the cross-OTT communication, information about an OTT server that the peer user with whom the OTT user requests to perform the cross-OTT communication currently logs in to; and the transceiver is further configured to send, according to the obtained information about the OTT server, the communication request to the OTT server that the peer user with whom the OTT user requests to perform the cross-OTT communication currently logs in to or an OTT interworking platform client used for a login of the peer user with whom the OTT user requests to perform the cross-OTT communication, so as to implement the cross-OTT communication.

With reference to the seventh aspect, in an eighth possible implementation manner of the seventh aspect, the transceiver is further configured to: before the processor obtains the OTT information of the target user, receive shared information that is posted by an OTT user and by using an OTT client; the processor is specifically configured to: obtain status information of a user who takes the OTT user as a cross-OTT friend; and the transceiver is further configured to: send, according to the obtained status information by using a push message or in an active request manner, the received shared information to an OTT client used for a login of the user who takes the OTT user as a cross-OTT friend; or send, according to the obtained status information by using a push message or in an active request manner, the received shared information to an OTT server that the user who takes the OTT user as a cross-OTT friend logs in to, so that the OTT server sends the shared information to an OTT client of the user who takes the OTT user as a cross-OTT friend.

With reference to the third possible implementation manner of the seventh aspect, in a ninth possible implementation manner of the seventh aspect, the transceiver is specifically configured to receive a request of the OTT user for acquiring OTT information of a friend of the OTT user, where the information about the target user is information about the friend of the OTT user; the processor is specifically configured to obtain the OTT information of the friend of the OTT user according to the information about the friend of the OTT user; and the transceiver is further configured to: send the obtained OTT information of the friend of the OTT user to the OTT user; or send the obtained OTT information of the friend of the OTT user to an OTT server that the OTT user logs in to.

With reference to the third possible implementation manner of the seventh aspect, in a tenth possible implementation manner of the seventh aspect, the transceiver is specifically configured to receive a request of an OTT server that the OTT user logs in to, where the request is used to obtain OTT information of a receiving user of shared information sent by the OTT user, where the information about the target user is the OTT information of the receiving user; and the transceiver is further configured to send the obtained OTT information of the receiving user to the OTT server that the OTT user logs in to.

With reference to the third possible implementation manner of the seventh aspect, in an eleventh possible implementation manner of the seventh aspect, the transceiver is specifically configured to receive a request of the OTT user for establishing a cross-OTT communication group, where the information about the target user is information about all OTT users who are requested to join the cross-OTT communication group. The processor is specifically configured to: obtain, according to the information of the OTT users who are requested to join the cross-OTT communication group, OTT information of all the OTT users who are requested to join the group; and establish the cross-OTT communication group of the OTT user according to the obtained OTT information of all the OTT users who are requested to join the cross-OTT communication group. The transceiver is further configured to send group establishment information to all the OTT users in the communication group or OTT servers that all the OTT users separately log in to.

With reference to the tenth possible implementation manner of the seventh aspect, in a twelfth possible implementation manner of the seventh aspect, the request that is for establishing the cross-OTT communication group and received by the transceiver further carries a name of the cross-OTT communication group that the OTT user requests to establish.

With reference to the twelfth possible implementation manner of the seventh aspect, in a thirteenth possible implementation manner of the seventh aspect, the processor is specifically configured to: save the name of the cross-OTT communication group that the OTT user requests to establish, and information about all members in the cross-OTT communication group.

With reference to the third possible implementation manner of the seventh aspect, in a fourteenth possible implementation manner of the seventh aspect, the transceiver is specifically configured to receive the cross-OTT service request of the OTT user by using an OTT server or an OTT interworking platform client.

According to an eighth aspect, an embodiment of the present invention provides an apparatus for interworking between different OTTs, including: a transceiver, configured to receive interworking information of a cross-OTT friend that is sent by an OTT interworking platform server or an OTT server; and a display, configured to display the interworking information of the cross-OTT friend that is received by the transceiver.

With reference to the eighth aspect, in a first possible implementation manner of the eighth aspect, the transceiver is further configured to: before receiving the interworking information of the cross-OTT friend that is sent by the OTT interworking platform server or the OTT server, send a cross-OTT service request to the OTT interworking platform server or the OTT server, so that the OTT interworking platform server or the OTT server returns the interworking information of the cross-OTT friend according to the cross-OTT service request.

With reference to the first possible implementation manner of the eighth aspect, in a second possible implementation manner of the eighth aspect, the cross-OTT service request received by the transceiver is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group. The interworking information of the cross-OTT friend that is received by the transceiver is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend. The display is specifically configured to display the information for recommending the cross-OTT friend, the online status information of the cross-OTT friend, the OTT information of a user to be added as a cross-OTT friend, the shared information that is posted by the cross-OTT friend, the OTT information of a friend of an OTT user, the information about an OTT user who is allowed to receive the shared information sent by the OTT user, or information about the cross-OTT communication group.

With reference to the second possible implementation manner of the eighth aspect, in a third possible implementation manner of the eighth aspect, the transceiver is further configured to: after the display displays the OTT information of a user to be added as a cross-OTT friend, send acknowledgment information of the user to the OTT interworking platform server or the OTT server.

With reference to the eighth aspect or any one of the first to the third possible implementation manners of the eighth aspect, in a fourth possible implementation manner of the eighth aspect, the apparatus is an OTT client or an OTT interworking platform client.

According to a ninth aspect, an embodiment provides an OTT server, including: a transceiver, configured to receive interworking information of a cross-OTT friend that is sent by an OTT interworking platform server; where the transceiver is further configured to send the received cross-OTT interworking information to a corresponding OTT client.

With reference to the ninth aspect, in a first possible implementation manner of the ninth aspect, the transceiver is further configured to: before the transceiver receives the interworking information of the cross-OTT friend that is sent by the OTT interworking platform server, receive a cross-OTT service request sent by the OTT client; and the transceiver is further configured to send the cross-OTT service request received by the transceiver to the OTT interworking platform server, so that the OTT interworking platform server returns the interworking information of the cross-OTT friend according to the cross-OTT service request.

With reference to the first possible implementation manner of the ninth aspect, in a second possible implementation manner of the ninth aspect, the cross-OTT service request received by the transceiver is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group. The interworking information of the cross-OTT friend that is received by the transceiver is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend.

With reference to the second possible implementation manner of the ninth aspect, in a third possible implementation manner of the ninth aspect, the transceiver is further configured to: after sending the received cross-OTT interworking information to the corresponding OTT client, receive acknowledgment information of the OTT user that is sent by the OTT client. The transceiver is further configured to send the received acknowledgment information to the OTT interworking platform server.

Embodiments provide a method and a device for interworking between different OTTs, where OTT information of a target user is obtained, and an interworking processing operation between cross-OTT friends is performed according to the obtained OTT information of the target user, so as to implement interworking between the cross-OTT friends.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the present invention clearer, the following further describes the present invention in detail with reference to the accompanying drawings. Apparently, the described embodiments are merely some rather than all of the embodiments of the present invention. All other embodiments obtained by persons of ordinary skill in the art based on the embodiments of the present invention without creative efforts shall fall within the protection scope of the present invention.

Figure 1A:
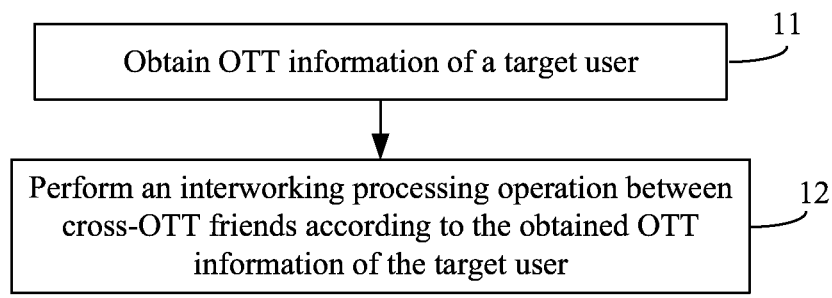
FIG. 1a is a flowchart of a method for interworking between different OTTs according to an embodiment.
Figure 1B:
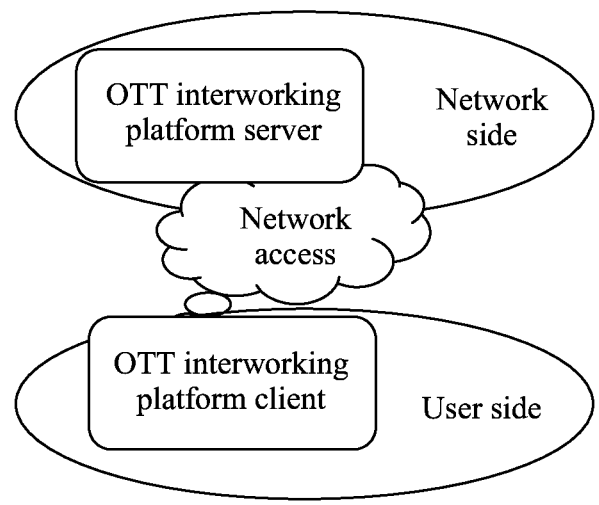
FIG. 1b is a schematic diagram of an OTT interworking platform in a method for interworking between different OTTs according to an embodiment.

FIG. 1a is a flowchart of a method for interworking between different OTTs according to an embodiment. The method shown in this embodiment is an operation procedure on a side of an OTT interworking platform server, where as shown in FIG. 1b, the OTT interworking platform server is a device, of an OTT interworking platform, on a network side and has a cross-OTT interaction function, for example, the OTT interworking platform server can interact with an OTT server of an OTT service, so that communication, information sharing, status display, OTT friend adding or recommending, and the like can be performed between users of different OTT services. In this embodiment, the method for interworking between different OTTs includes the following steps.

Step 11: Obtain OTT information of a target user.

Step 12: Perform an interworking processing operation between cross-OTT friends according to the obtained OTT information of the target user.

Interworking between different OTT friends may be cross-OTT friend recommending, for example, a user of one OTT service is recommended as a friend of a user of another OTT service; or may be displaying of a status of a cross-OTT friend, for example, a client of a user of one OTT service displays status information of a user of another OTT service; or may be cross-OTT friend adding, for example, a user of one OTT service is added as a friend of a user of another OTT service; or may be cross-OTT communication, for example, a user of one OTT service communicates with a user of another OTT service; or may be cross-OTT information sharing, for example, personal shared information that is posted by a user of one OTT service is shared by a user of another OTT service; or may be establishment of a cross-OTT communication group, for example, a communication group is established between an OTT A user, an OTT B user, and an OTT C user.

Cross-OTT friends refer to two users who register user account numbers separately with different OTT servers. After one user adds the other user as a friend, or they add a friendship with each other, the two users are cross-OTT friends to each other.

When interworking between different OTTs is used for friend recommending, the foregoing step 11 may include: obtaining the OTT information of the target user according to at least one association relationship of an association relationship between intra-OTT friends of an OTT user and an association relationship between cross-OTT friends of the OTT user; and correspondingly, step 12 may include: sending, by using a push message, the OTT information of the target user to the OTT user or an OTT server that the OTT user logs in to, where the OTT information of the target user is used for recommending a new cross-OTT friend or a new intra-OTT friend to the OTT user.

For example, as shown in FIG. 2, FIG. 3, FIG. 4, FIG. 5, FIG. 6, FIG. 7, and FIG. 8, when two or more than two friends (for example, users B and C) of a user (for example, a user A) have any other OTT user as a common friend (for example, a user D), the OTT interworking platform server may further recommend the user D to the user A. A relationship between the user A, the user B, the user C, and the user D may be that the users separately belong to four different OTT services, or may be that two users of them jointly use one OTT service, or three users of them jointly use one OTT service. For an OTT A service, an OTT A server is disposed on a network side, and an OTT A client is disposed on a user side, so as to implement the OTT A service; for an OTT B service, an OTT B server is disposed on a network side, and an OTT B client is disposed on a user side, so as to implement the OTT B service; for an OTT C service, an OTT C server is disposed on a network side, and an OTT C client is disposed on a user side, so as to implement the OTT C service; for an OTT D service, an OTT D server is disposed on a network side, and an OTT D client is disposed on a user side, so as to implement the OTT D service.

Figure 2:
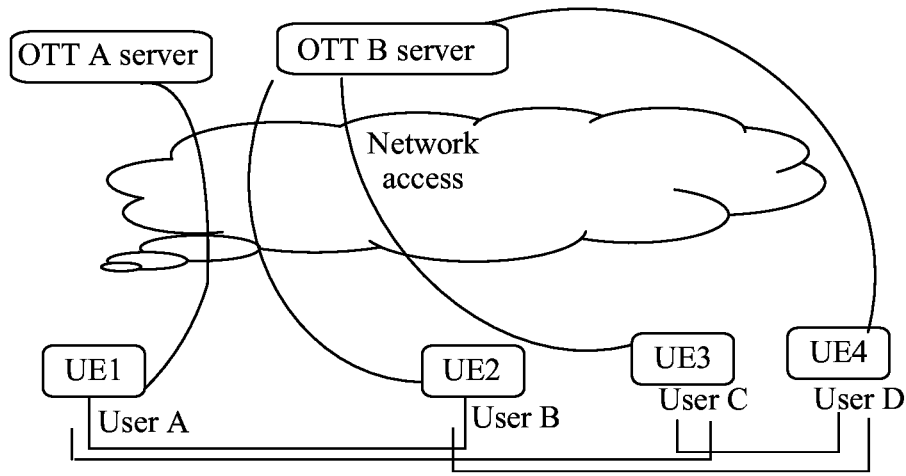
FIG. 2 is a schematic application diagram of a method for interworking between different OTTs according to an embodiment.

As shown in FIG. 2, the user A registers an OTT A account number, while the users B, C, and D register with/log in to the OTT B service. In addition, both the users B and C are cross-OTT friends of the user A. When both the users B and C take the user D as a friend, the OTT interworking platform server may recommend the user D to the user A as a cross-OTT friend.

Figure 3:
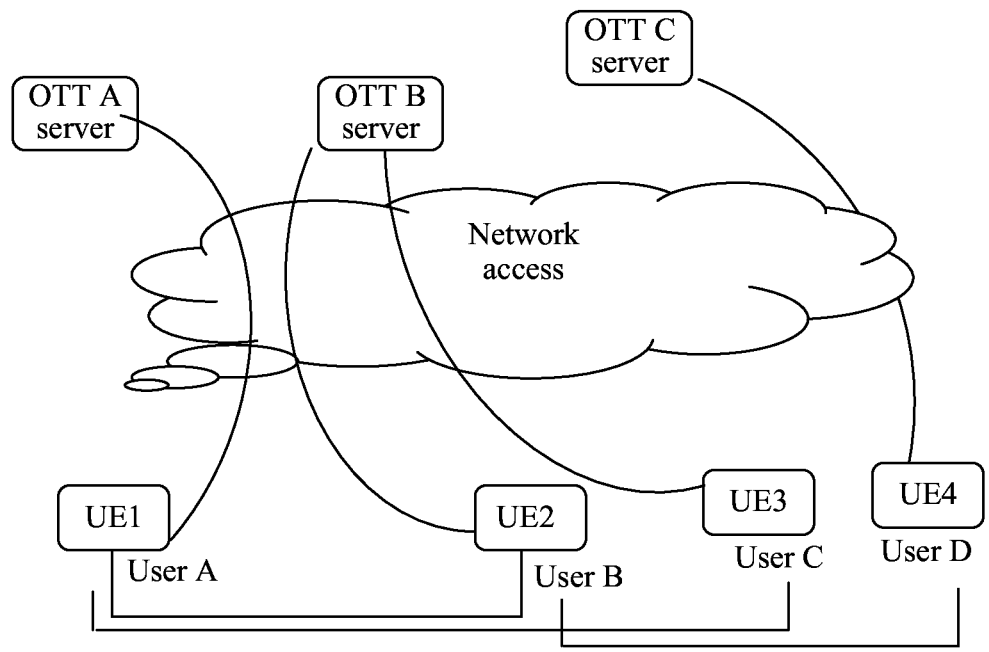
FIG. 3 is another schematic application diagram of a method for interworking between different OTTs according to an embodiment.

As shown in FIG. 3, the user A registers an OTT A account number, while the users B and C register with/log in to the OTT B service, and the user D registers with/logs in to the OTT C service. Both the users B and C are cross-OTT friends of the user A. When both the users B and C take the user D as a cross-OTT friend, the OTT interworking platform server may recommend the user D to the user A.

Figure 4:
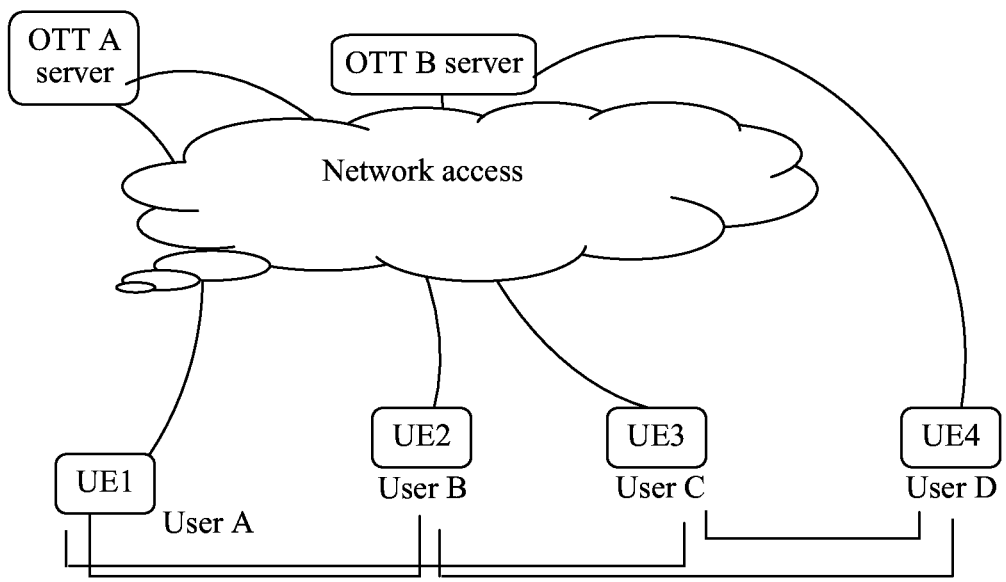
FIG. 4 is another schematic application diagram of a method for interworking between different OTTs according to an embodiment.

As shown in FIG. 4, the users A and B register an OTT A account number, while the users C and D register with/log in to the OTT B service. The user B is a friend of the user A within the OTT A, while the user C is a cross-OTT friend of the user A. When both the users B and C take the user D as a friend, the OTT interworking platform server may recommend the user D to the user A.

Figure 5:
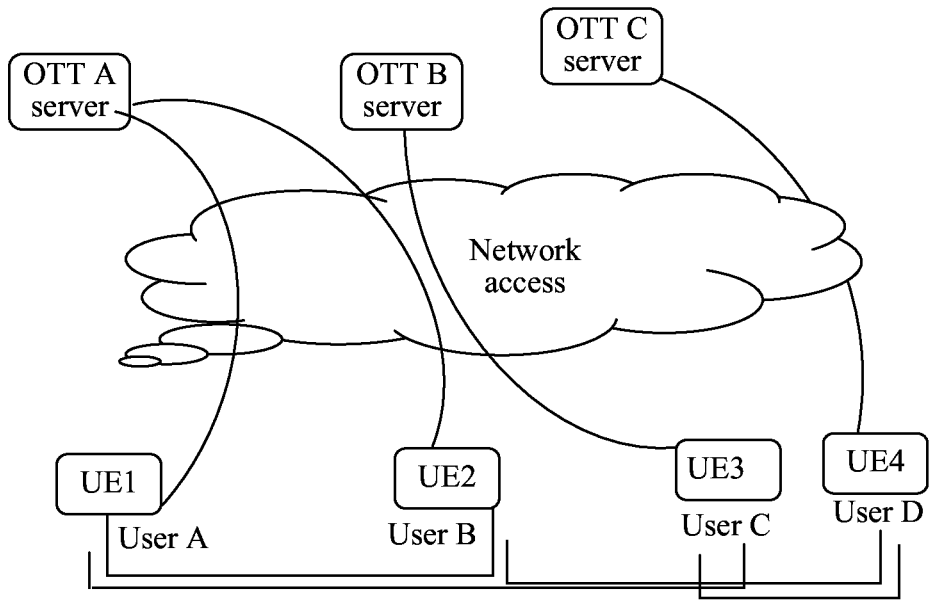
FIG. 5 is another schematic application diagram of a method for interworking between different OTTs according to an embodiment.

As shown in FIG. 5, the users A and B register an OTT A account number, while the user C registers with/logs in to the OTT B service, and the user D registers with/logs in to the OTT C service. The user B is a friend of the user A within the OTT A service, while the user C is a cross-OTT friend of the user A. When both the users B and C take the user D as a cross-OTT friend, the OTT interworking platform server may recommend the user D to the user A.

Figure 6:
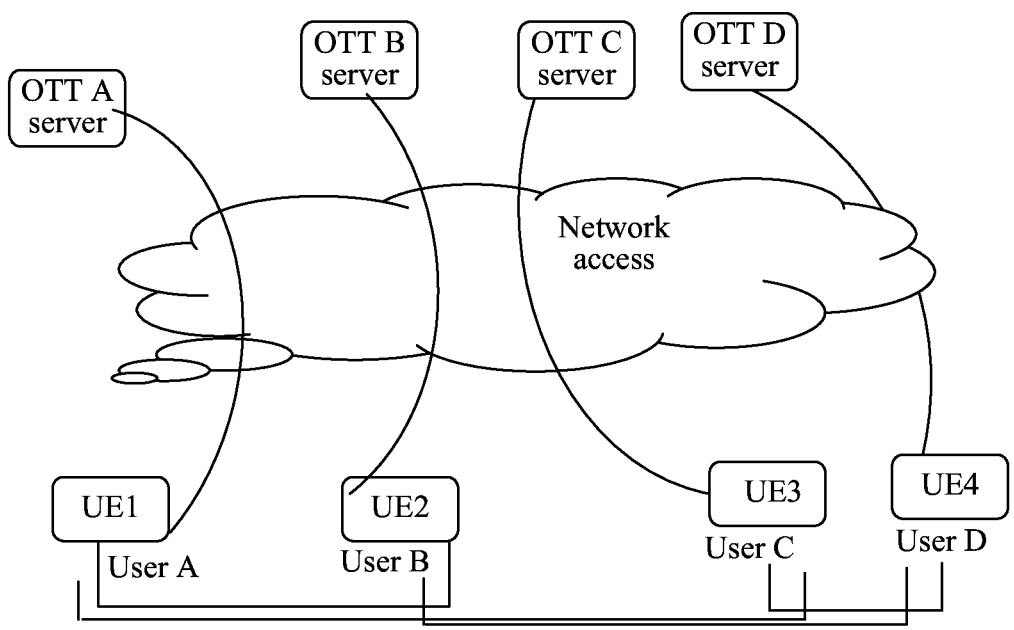
FIG. 6 is another schematic application diagram of a method for interworking between different OTTs according to an embodiment.

As shown in FIG. 6, the user A registers an OTT A account number, while the user B registers with/logs in to the OTT B service, the user C registers with/logs in to the OTT C service, and the user D registers with/logs in to the OTT D service. Both the users B and C are cross-OTT friends of the user A. When both the users B and C take the user D as a cross-OTT friend, the OTT interworking platform server may recommend the user D to the user A.

Figure 7:
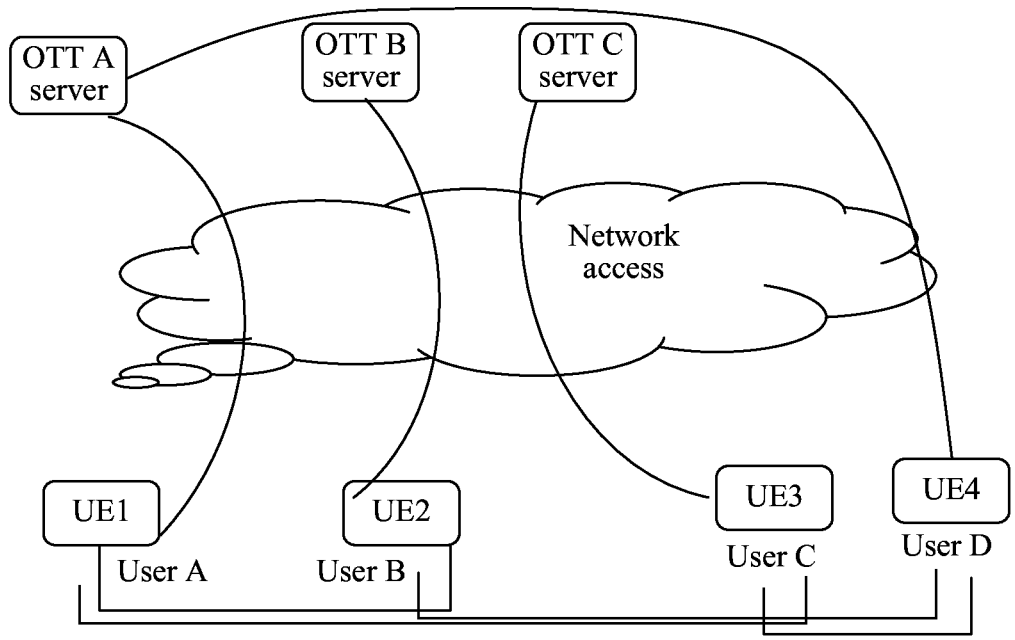
FIG. 7 is another schematic application diagram of a method for interworking between different OTTs according to an embodiment.

As shown in FIG. 7, the users A and D register an OTT A account number, while the user B registers with/logs in to the OTT B service, the user C registers with/logs in to the OTT C service, and both the users B and C are cross-OTT friends of the user A. When both the users B and C take the user D as a cross-OTT friend, the OTT interworking platform server may recommend the user D to the user A.

Figure 8:
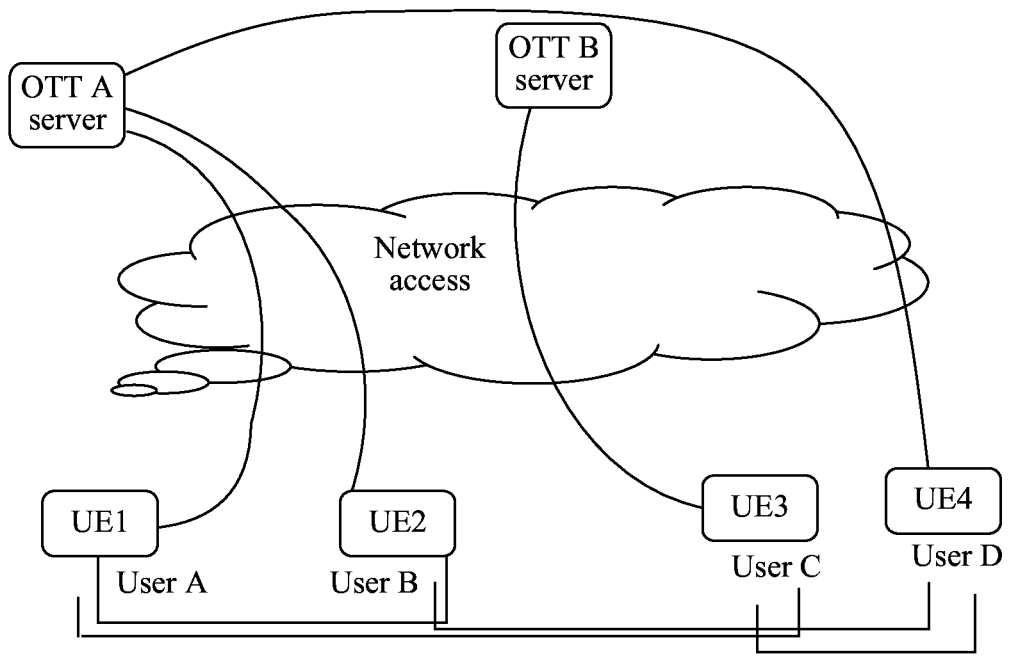
FIG. 8 is another schematic application diagram of a method for interworking between different OTTs according to an embodiment.

As shown in FIG. 8, the users A, B, and D register an OTT A account number, while the user C registers with/logs in to the OTT B service, the user B is an intra-OTT friend of the user A, and the user C is a cross-OTT friend of the user A. When both the users B and C take the user D as a cross-OTT friend, the OTT interworking platform server may recommend the user D to the user A.

In scenarios shown in FIG. 2 to FIG. 8, if it is assumed that an OTT interworking platform client is installed on a terminal of the user A, and the OTT interworking platform server has friend lists of all users, the OTT interworking platform server can learn that friends of the user A are the user B and the user C. As shown in FIG. 1b, the OTT interworking platform client corresponds to the OTT interworking platform server and is located on the user side, or rather, the OTT interworking platform client is a client of the OTT interworking platform server, and can interact with the OTT interworking platform server to build up an OTT interworking platform, so as to implement interworking between different OTT users.

After the user B and the user C add the user D as an intra-OTT friend or a cross-OTT friend, the OTT interworking platform server locally updates friend lists of the user B and the user C in a synchronous manner, and sends friend recommending information to the OTT interworking platform client of the user A, so as to recommend the user D to the user A.

After the OTT interworking platform client of the user A receives the friend recommending information sent by the OTT interworking platform server, the user A may choose whether to add the user D as a friend, and feed back a result of choosing to the OTT interworking platform server.

If the user A chooses to add the user D as a friend, the OTT interworking platform server adds an OTT account number of the user D into an OTT friend list of the user A, thereby completing an OTT friend adding operation for the user A.

After completing the friend adding, the OTT interworking platform server notifies the OTT interworking platform client of the user A, and updates friend list information, of the user A, on the side of the OTT interworking platform server in a synchronous manner.

Further, the OTT interworking platform server may further notify the client of the user A at the same time, so as to display updated friend list information to the user A.

Alternatively, in the scenarios shown in FIG. 2 to FIG. 8, if no OTT interworking platform client is installed on the terminal of the user A, the user A can also add the user D as a friend by using a client of an OTT service that the user A registers with/logs in to, that is, the OTT A client in this embodiment.

Specifically, the OTT interworking platform server still has the friend lists of all the users, and the OTT interworking platform server can learn, according to the friend lists, that friends of the user A are the user B and the user C.

The user B and the user C add the user D as a friend (who may be an intra-OTT friend, or may be a cross-OTT friend), and the OTT interworking platform server updates friend lists of the user B and the user C in a synchronous manner.

The OTT interworking platform server sends friend recommending information to the OTT A server of the user A.

The OTT A server sends the friend recommending information to the OTT A client.

The user A may choose, according to the friend recommending information received by the OTT A client, whether to add the user D as a friend, and feed back a result of choosing to the OTT A server.

After receiving the result that is fed back, the OTT A server sends the result to the OTT interworking platform server.

If it is assumed that the user A chooses to add the user D as a friend, the OTT interworking platform server adds an OTT account number of the user D into a friend list of the user A, thereby completing a friend adding operation.

After completing the friend adding operation, the OTT interworking platform server notifies the OTT A server of an adding result, and may further notify an OTT server that the user D currently logs in to, so that the user D learns about the information.

After receiving a notification of the adding result, the OTT A server updates friend list information of the user A on the OTT A server in a synchronous manner.

When interworking between different OTTs is used for displaying a status of a cross-OTT friend, the foregoing step 11 may include: obtaining online status information of the target user; and correspondingly, step 12 may include: sending the online status information of the target user to a user who takes the target user as a cross-OTT friend; or sending the online status information of the target user to an OTT server that a user who takes the target user as a cross-OTT friend logs in to. In this way, an OTT client of a cross-OTT friend of the OTT user can display a status of the cross-OTT friend of the OTT user. The OTT server can also collect statuses of OTT friends, including a cross-OTT friend, of a user of the OTT server by using a related method, so as to extend more applications based on related information.

The obtaining online status information of the target user includes: obtaining go-online information or go-offline information of the target user; or obtaining go-online information of the target user and information about an OTT that the target user logs in to; or obtaining offline information of the target user and information about an OTT that the target user logs in to.

Figure 9:
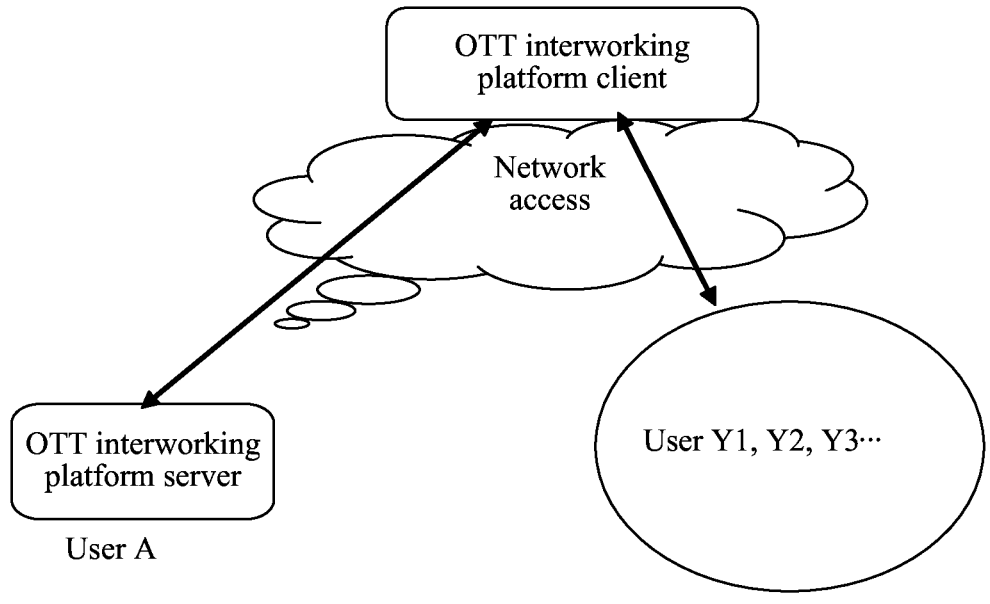
FIG. 9 is another schematic application diagram of a method for interworking between different OTTs according to an embodiment.

For example, in a scenario shown in FIG. 9, an OTT interworking platform client is installed on the terminal of the user A, and the OTT interworking platform server on the network side can learn that users who add the user A as a friend are users Y1, Y2, Y3, and the like. In addition, an OTT interworking platform client is also installed on terminals of the users Y1, Y2, Y3, and the like who add the user A as a friend.

The user A logs in to an interworking platform interface by using the OTT interworking platform client as an entrance. The OTT interworking platform client interacts with the OTT interworking platform server, thereby completing a login of the user A.

After the user A logs in to the OTT interworking platform, the OTT interworking platform server updates status information of the user A in a synchronous manner.

In addition, the OTT interworking platform server searches for a friend list of the user A to learn about online status information of the friends such as the users Y1, Y2, and Y3 of the user A, and returns the status information of the friends such as the users Y1, Y2, and Y3 to the OTT interworking platform client of the user A.

It is worth noting that it is assumed herein that the OTT interworking platform server may learn about the online status information of the friends such as the users Y1, Y2, and Y3 of the user A in a same manner as that of acquiring an online status of the user A.

Herein, the OTT interworking platform server may send the online status information of the friends such as the users Y1, Y2, and Y3 directly to the OTT interworking platform client of the user A by using a push message, that is, once the user A is found online, status information of all friends of the user A is immediately sent to the user A.

The OTT interworking platform server may also use an active request (pull) manner, that is, after the user A logs in, the OTT interworking platform server does not actively send the status information of the friends of the user A to the OTT interworking platform client of the user A, but sends the status information of the friends of the user A to the OTT interworking platform client of the user A after receiving a request from the user A.

When the OTT interworking platform server sends the status information of the friends of the user A in the pull manner, the OTT interworking platform client of the user A may request the status information of the friends of the user A from the network side immediately after the user A enters, by clicking/tapping, an interface related to an address book, and after receiving the status information of the friends that is returned by the OTT interworking platform server, display the status information to the user A.

Alternatively, the OTT interworking platform server may further search for users who take the user A as a friend, so as to learn about online statuses of these users and send, for display, the online status information of the user A to OTT interworking platform clients that these online users who add the user A as a friend separately log in to.

It should be noted that there is no limitation to a time sequence of implementation of the displaying the status information of the friends of the user A and the displaying, by the clients of the users who take the user A as a friend, the online status information of the user A, which may be performed concurrently or not performed concurrently.

When a status of a user (for example, the user A) changes (for example, from go-online to go-offline or offline), the OTT interworking platform server acquires refreshed status information of the user. For example, the OTT interworking platform client notifies the OTT interworking platform server of go-offline information of the user A; or the OTT interworking platform server performs determining by itself, for example, if no UE heartbeat packet is received for a long time, the OTT interworking platform server determines that the user A already goes offline.

The OTT interworking platform server locally updates the status information of the user A to go-offline, and sends, in a synchronous manner and for display, updated status information of the user A to the OTT interworking platform clients that all the online users who take the user A as a friend separately log in to.

Likewise, when status information of any friend of the user A changes (for example, from go-online to go-offline or offline, the OTT interworking platform server sends new status information of the friend to the OTT interworking platform client of the user A for display.

Figure 10:
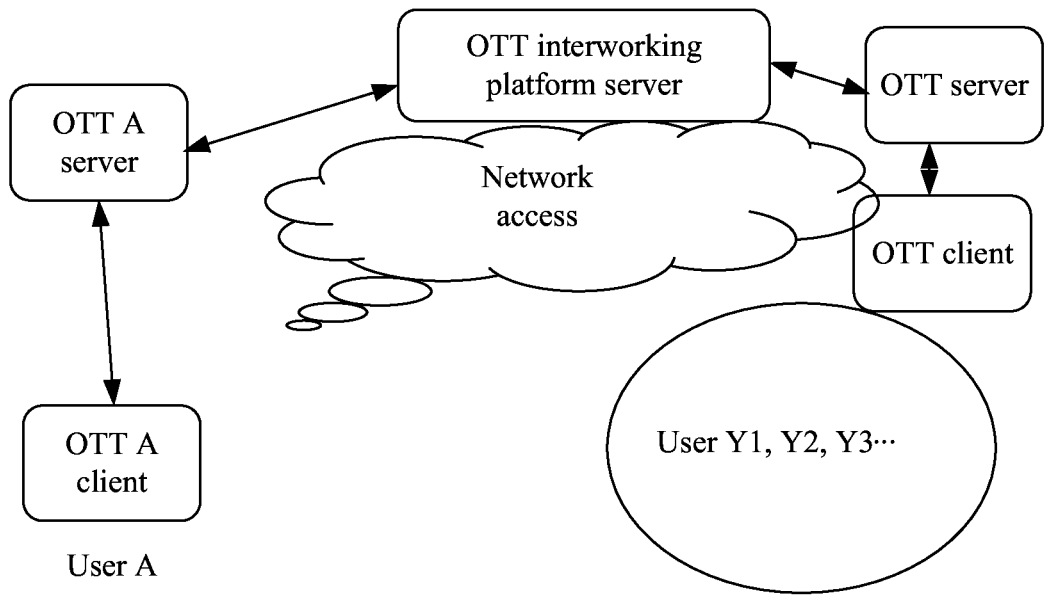
FIG. 10 is another schematic application diagram of a method for interworking between different OTTs according to an embodiment.

It is assumed that in a scenario shown in FIG. 10, an OTT client is installed on the terminal of the user A and the terminals of the users Y1, Y2, Y3, and the like who take the user A as a friend (for example, the user A logs in to the OTT A server by using the OTT A client).

When the user A logs in by using the OTT A client, the OTT A client interacts with the OTT A server, thereby completing a login of the user A.

After the user A logs in, the OTT A server notifies the OTT interworking platform server of go-online information of the user A.

After receiving the go-online information of the user A that is sent by the OTT A server, the OTT interworking platform server locally updates the status information, including an identity of an OTT that the user A currently logs in to and a go-online status, of the user A in a synchronous manner.

Afterwards, the OTT interworking platform server searches for a friend list of the user A, so as to learn about online status information of these friends; then the OTT interworking platform server sends the status information of the friends of the user A to the OTT A server.

It is worth noting that the obtaining, by the OTT A server, the online status information of the friends of the user A described herein is merely one implementation manner, and a possibility is not excluded that the OTT A has already learned about the friend list of the user A from the interworking platform previously at some time, and learned about and saved the online information of these friends separately at other time.

The OTT A server sends, in a push or pull manner, the received status information of the friends of the user A to the OTT A client used for a login of the user A for display, where the received status information of the friends of the user A includes a name of an OTT that the friends of the user A log in to and a go-online status. When the OTT A server sends, in the pull manner, the received status information of the friends of the user A to the OTT A client used for the login of the user A for display, the OTT A client may request the status information of the friends of the user A from the network side immediately after the user enters, by clicking/tapping, the interface related to the address book, and display the status information after receiving the status information of the friends that is returned by the OTT A server. For details about the push or pull manner, reference may be made to a description in the foregoing embodiment.

The OTT interworking platform server may further search for users who take the user A as a friend, so as to learn about online statuses of these users; then the OTT interworking platform server sends, in the pull or push manner, the online status information of the user A to OTT servers that all the online users who add the user A as a friend separately log in to. Afterwards, the OTT servers that all the online users who add the user A as a friend separately log in to send, for display, the received online status information of the user A to the OTT clients separately used for logins of all the online users who add the user A as a friend. For example, the online user Y1 who adds the user A as a friend logs in to the OTT B server, and the online user Y2 who adds the user A as a friend logs in to the OTT C server; then the OTT interworking platform server sends the online status information of the user A to the OTT B server and the OTT C server. Afterwards, the OTT B server sends the online status information of the user A to the OTT B client used for a login of the user Y1 for display, and the OTT C server sends the online status information of the user A to the OTT C client used for a login of the user Y2 for display.

It should be noted that there is no limitation to a time sequence of implementation of the displaying the status information of the friends of the user A and the displaying, by the clients of the users who take the user A as a friend, the online status information of the user A, which may be performed concurrently or not be performed concurrently.

When a status of a user (for example, the user A) changes (for example, from go-online to go-offline or offline), the OTT A server acquires status change information of the user. For example, the OTT A client notifies the OTT A server of go-offline information of the user A; or the OTT A server performs determining by itself, for example, if no UE heartbeat packet is received for a long time, the OTT A server determines that the user A already goes offline.

The OTT A server sends the status change information of the user A to the OTT interworking platform server, where the status change information is user go-offline information in this embodiment.

The OTT interworking platform server updates the status information of the user A on the OTT interworking platform server (for example, changed to go-offline).

The OTT interworking platform server sends new status information of the user A to the OTT servers that all the online users who take the user A as a friend separately log in to (for example, to the OTT B server and the OTT C server).

The OTT servers that all the online users who take the user as a friend log in to send, for display, the new status information of the user A to the OTT clients used for logins of all the online users who take the user as a friend.

Likewise, when status information of any friend of the user A changes, the OTT interworking platform server may send new status information of the friend to the OTT A server, and then the OTT A server sends the received status information of the friend to the OTT A client for display.

Figure 11:
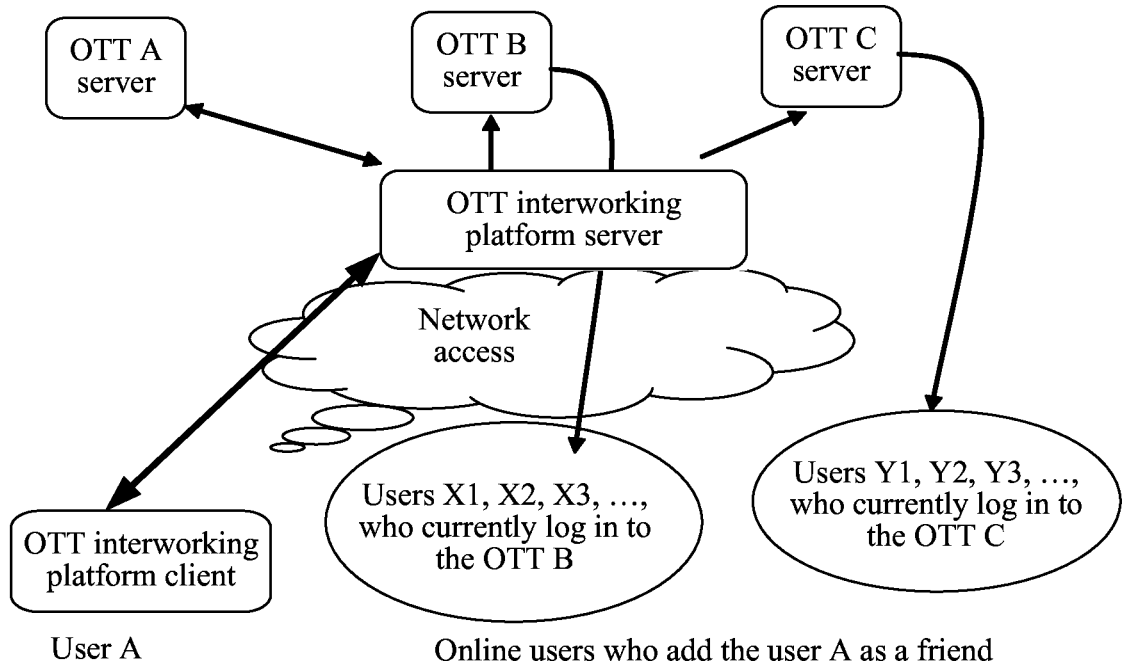
FIG. 11 is another schematic application diagram of a method for interworking between different OTTs according to an embodiment.

Alternatively, in a scenario shown in FIG. 11, the user A logs in by using an OTT interworking platform client (the OTT A service used by the user A may be implemented by means of interaction between the OTT interworking platform client and the OTT interworking platform server and interaction between the OTT interworking platform server and the OTT A server). Online users X1, X2, X3, and the like who take the user A as a friend use the OTT B service and log in by using the OTT interworking platform client and the OTT interworking platform server (the OTT B service used by the users X1, X2, X3, and the like may be implemented by means of interaction between the OTT interworking platform client and the OTT interworking platform server or interaction between the OTT interworking platform server and the OTT B server). Online users Y1, Y2, Y3, and the like who take the user A as a friend use the OTT C service and log in to the OTT C server by using the OTT C client.

A process in which the OTT interworking platform client of the user A displays friend status information of the user A is the same as the method provided in the foregoing embodiment shown in FIG. 9.

The OTT interworking platform server searches for all users who take the user A as a friend, so as to learn about online statuses of these users and clients used for current logins of these users. In this embodiment, the OTT interworking platform server finds that the online users X1, X2, X3, and the like who take the user A as a friend log in by using the OTT interworking platform client, and that the online users Y1, Y2, Y3, and the like who take the user A as a friend log in by using the OTT C client.

Afterwards, the OTT interworking platform server sends, in the push or pull manner and for display, the online status information of the user A to the OTT interworking platform client used for logins of the online users X1, X2, and X3 who add the user A as a friend, and sends the online status information of the user A to the OTT C server that the online users Y1, Y2, and Y3 who add the user A as a friend log in to.

The OTT C server that receives the online status information of the user A may send, in the push or pull manner and for display, the online status information of the user A to the OTT C client used for logins of the users Y1, Y2, and Y3.

When status information of any friend of the user A changes, the OTT interworking platform server updates the status information of the friend, and sends updated status information of the friend to the OTT interworking platform client of the user A for display.

When the user A goes offline, the OTT interworking platform server obtains go-offline information of the user A by using the OTT interworking platform client, and sends, for display, the go-offline information of the user A to a client of an online user who adds the user A as a friend. Specifically, for an online user who adds the user A as a friend and logs in by using an OTT interworking platform client, the OTT interworking platform server sends the go-offline information of the user A to the OTT interworking platform client of the online user who adds the user A as a friend; for an online user who adds the user A as a friend and logs in by using an OTT client, the OTT interworking platform server sends the go-offline information of the user A to an OTT server that the online user who adds the user A as a friend logs in to, and then the OTT server sends the received go-offline information of the user A to the corresponding OTT client.

Figure 12:
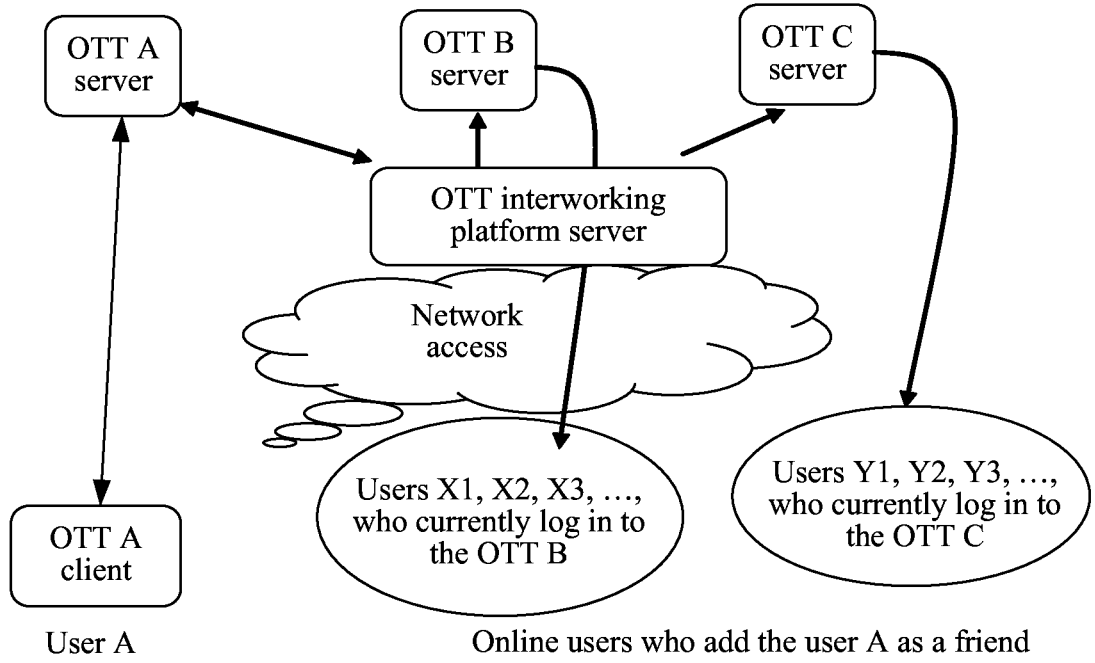
FIG. 12 is another schematic application diagram of a method for interworking between different OTTs according to an embodiment.

It is assumed that in a scenario shown in FIG. 12, nothing is changed except that the user A logs in to the OTT A server by using the OTT A client.

When the OTT A client of the user A displays friend status information of the user A, the OTT interworking platform server may send, by using the OTT A server, status information of a found online friend of the user A to the OTT A client of the user A for display.

A method in which clients of all online users who take the user A as a friend display the status information of the user A is the same as the method in which clients of all online users who take the user A as a friend display the status information of the user A in the foregoing scenario in FIG. 10 in which the user A logs in by using the OTT interworking platform client, and details are not described herein again.

When status information of any friend of the user A changes, the OTT interworking platform server sends, by using the OTT A server, new status information of the friend to the OTT A client of the user A for display.

In the foregoing embodiment in which an OTT interworking platform client implements display of a friend status, statuses of all OTT friends in an address book of a user may be displayed, where an OTT friend may be a friend that uses a same OTT service as the user, or may be a cross-OTT friend. In this way, the OTT user can promptly learn about an online status of an OTT friend of the OTT user, and therefore, when online, the friend of the OTT user can initiate a real-time cross-OTT chat, such as a chat operation of voice, video, text, or file transfer, with the OTT user according to a requirement. The OTT user can communicate directly or indirectly with the OTT interworking platform server on the network side by using an OTT interworking platform client or an OTT client, thereby implementing interworking between different OTT users.

When interworking between different OTTs is used for OTT friend adding, cross-OTT communication or cross-OTT information sharing, acquiring OTT information of a friend of the OTT user, acquiring information about an OTT user who can receive the shared information sent by the OTT user, establishing a cross-OTT communication group, or communication of a cross-OTT communication group, before the foregoing step 11, the method may further include: receiving a cross-OTT service request from an OTT user, where the cross-OTT service request carries information about the target user.

Correspondingly, the foregoing step 11 may include: obtaining the OTT information of the target user according to the information about the target user, where the OTT information includes an OTT account number.

When interworking between different OTTs is used for adding an OTT friend, the cross-OTT service request may be a request for adding a cross-OTT friend, where the information about the target user may include information about a user to be added as a cross-OTT friend.

The obtaining OTT information of a target user may include: obtaining, according to the information about the user to be added as a cross-OTT friend, OTT account information of the user to be added as a cross-OTT friend, where the OTT account information mainly includes information about an OTT account number registered by the user, and further includes information such as a user name, a password, and contact information that are entered during registration.

The performing an interworking processing operation between cross-OTT friends according to the obtained OTT information of the target user may include: adding, into an OTT friend list of the OTT user according to the obtained OTT account information of the user to be added as a cross-OTT friend, an OTT account number of the user to be added as a cross-OTT friend.

Exemplarily, before the receiving a cross-OTT service request of an OTT user, the method may further include: receiving a query request of the OTT user, where the query request is used to query the OTT account information of the user to be added as a cross-OTT friend; obtaining, according to the query request, the OTT account information of the user to be added as a cross-OTT friend; and sending, to the OTT user or a server that the OTT user logs in to, the obtained OTT account information of the user to be added as a cross-OTT friend.

When OTT friend adding requires an acknowledgment of the OTT user who initiates the request, before the adding, into an OTT friend list of the OTT user, an OTT account number of the user to be added as a cross-OTT friend, the method may further include: sending, to the OTT user or an OTT server that the OTT user logs in to, the OTT account information of the user to be added as a cross-OTT friend; receiving acknowledgment information returned by the OTT user or the OTT server that the OTT user logs in to, where the acknowledgment information includes information for adding, as friends, all or some OTT account numbers of the user to be added as a cross-OTT friend; and adding, into the OTT friend list of the OTT user according to the information for adding, as friends, all or some OTT account numbers of the user to be added as a cross-OTT friend, all or some OTT account numbers of the user to be added as a cross-OTT friend.

Figure 13:
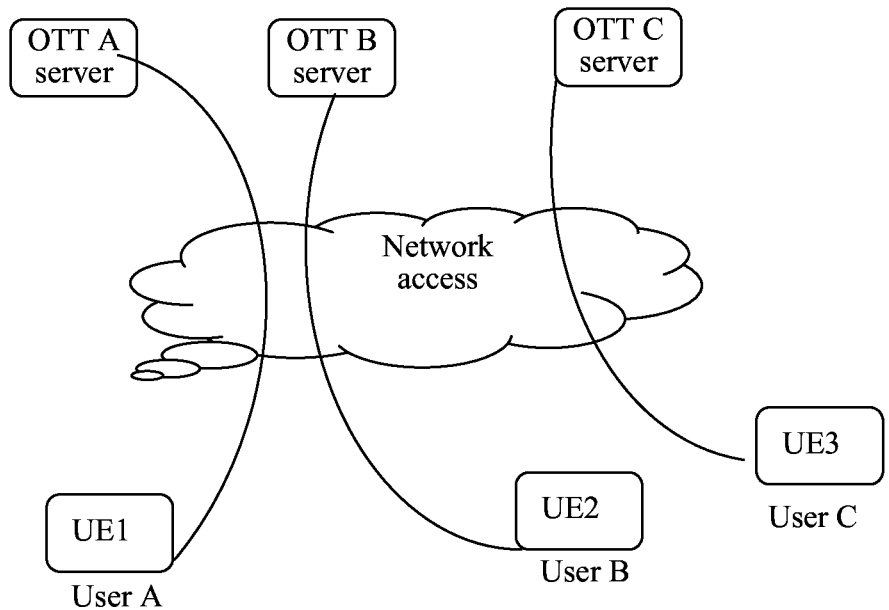
FIG. 13 is another schematic application diagram of a method for interworking between different OTTs according to an embodiment.

For example, in a scenario shown in FIG. 13, the user A registers an OTT account number (which is assumed to be OTT A) on the OTT A server by using a terminal UE1. Under some circumstances, relatives and friends of the user A, for example, the users B and C, do not register an account number on the OTT A (or even though they register an OTT A account number, they do not use it frequently), but register an account number on the OTT B server and the OTT C server by using a terminal UE2 and a terminal UE3 respectively. By using a function provided by the OTT interworking platform, the cross-OTT account numbers of the users B and C (cross-OTT indicates an OTT that is different from the OTT of the user A) can be found for the user A, and are added as cross-OTT friends of the user A (a cross-OTT friend is a user who is in friends of the user A and whose OTT is different from the OTT of the user A).

In this embodiment, the user A downloads and installs an OTT interworking platform client by using the terminal UE1, and the user A communicates with the OTT interworking platform server on the network side by using the OTT interworking platform client, thereby completing a corresponding OTT function.

Specifically, the OTT interworking platform client can provide an operation interface for a user, and all OTT operations of the user A are performed on the OTT interworking platform client.

For example, to add an OTT friend, the user A may enter any contact information of a to-be-added friend, for example, the user B, in the operation interface of the OTT interworking platform client. For example, the user A may provide an account number of the user B on the OTT B server, or any other contact information, for example, a mobile number, an email address, any other OTT account number, or a nickname of the user B. If the nickname is entered, OTT information registered for the nickname needs to be further provided.

The OTT interworking platform client sends, to the OTT interworking platform server, a related request (a query request or an adding request) that is for adding a cross-OTT friend and carries the information about the target user entered by a user, for example, information about the user B.

After receiving the related request, the OTT interworking platform server searches for OTT information of the user B according to the information, about the target user, carried in the request, where the OTT information may be all OTT account numbers registered by the user B.

Specifically, it is assumed herein that the OTT interworking platform server has learned about and saved all account information of all OTT users in a particular manner in advance, which may be that when all users register with an OTT service, perform maintenance in a later period, or cancel the OTT service, a corresponding OTT server synchronizes information about the registration, later-period maintenance, cancellation, and the like to the OTT interworking platform server, and the OTT interworking platform server saves the information. In this way, the OTT interworking platform server can search for the OTT information of the target user locally.

Further, the user B may further preset whether to allow all OTT account numbers of the user B to be sent to any query user, or which type of user is allowed to obtain account number information of the user B, and whether to require a network to acquire consent of the user B before returning a query result to a query user (the user A herein) each time, and the like. These settings may also be synchronized to the OTT interworking platform server. In this way, the OTT interworking platform server may determine, according to the settings of the user B, to perform a corresponding operation.

After finding a list of all OTT account numbers of the user B, the OTT interworking platform server returns the list of all OTT account numbers of the user B or only an account number of the user B on the OTT B to the OTT interworking platform client.

The user A may choose to add, from all account numbers of the user B that are returned by the OTT interworking platform server, the OTT B account number or all other contact information of the user B as a cross-OTT friend of the user A.

The user A sends a choice of the user A to the OTT interworking platform server by using the OTT interworking platform client on the terminal UE1.

The OTT interworking platform server adds the OTT B account number or all other contact information of the user B into a cross-OTT friend list of the user A according to the choice of the user A, thereby completing adding of the cross-OTT friend.

After completing a friend adding operation, the OTT interworking platform server returns information about whether adding is successful to the OTT interworking platform client of the user A.

The user A may add another friend user C (a user of OTT C) into the friend list in a same manner, thereby implementing adding of the cross-OTT friend.

When the user A chooses to delete the user B from the friend list, the user A may perform a deleting operation in the interface of the OTT interworking platform client.

The OTT interworking platform client sends information related to deleting the user B to the OTT interworking platform server.

After receiving the information related to deleting the user B, the OTT interworking platform server deletes contact information such as the OTT account number of the user B from the friend list of the user A, thereby completing a friend deleting operation.

Figure 14:
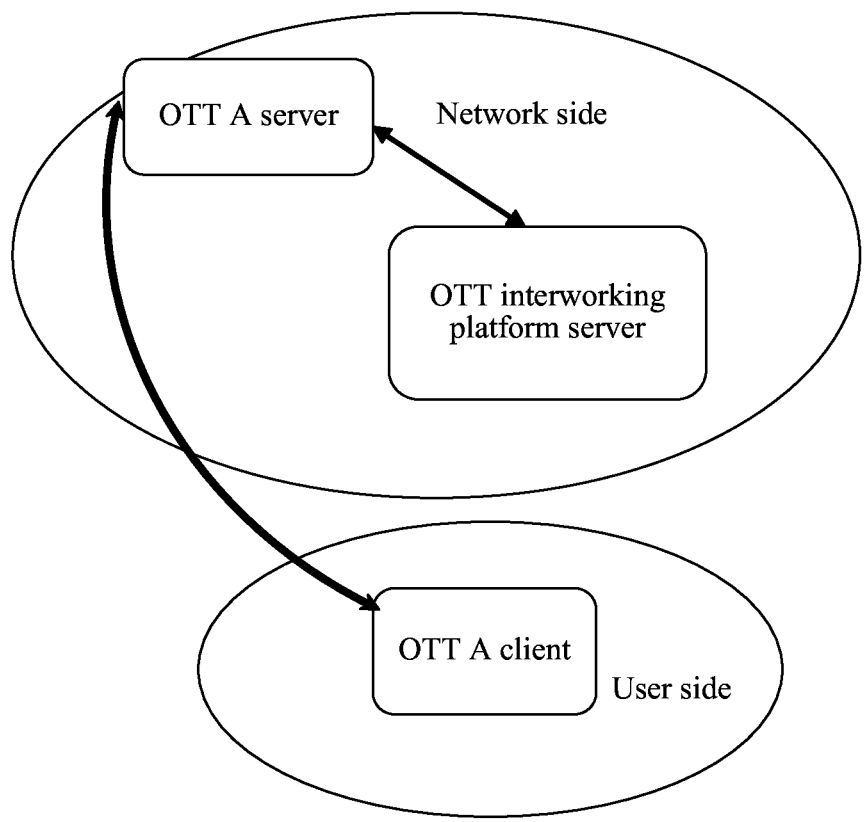
FIG. 14 is another schematic application diagram of a method for interworking between different OTTs according to an embodiment.

Alternatively, for example, in a scenario shown in FIG. 14, a special OTT interworking platform client does not need to be installed on the terminal of the user A; instead, existing clients of all OTTs are extended to implement interaction with the OTT interworking platform server.

In this scenario, the user A may enter any contact information of the to-be-added friend user B in the operation interface of the OTT A client. For example, the user A may directly provide an account number of the friend B on the OTT B, or any other contact information, for example, a mobile number, an email, any other OTT account number, or even a nickname of the user B on an OTT. If the nickname of the user B is entered, OTT information registered for the nickname, for example, the OTT account number, needs to be further provided.

The OTT A client sends, to the OTT interworking platform server by using the OTT A server, a cross-OTT friend request that is initiated by the user A and carries the information about the target user entered by the user A.

After receiving the request, the OTT interworking platform server searches for all OTT account numbers of the user B according to the information about the target user, which is the contact information of the user B herein, in the request.

Further, the user B may further preset whether to allow all OTT account numbers of the user B to be sent to any query user, or which type of user is allowed to obtain account number information of the user B, and whether to require a network to acquire consent of the user B before returning a query result to a query user (the user A herein) each time, and the like. These settings may also be synchronized to the OTT interworking platform server. In this way, the OTT interworking platform server may determine, according to the settings of the user B, to perform a corresponding operation.

After finding the list of all OTT account numbers of the user B or only the account number of the user B on the OTT B, the OTT interworking platform server sends the found information to the OTT A server, and then the OTT A server sends the found information to the OTT A client.

The user A may choose to add, by using the OTT A client and from all account numbers of the user B that are returned by the OTT A server, the OTT B account number or all other contact information of the user B as a cross-OTT friend of the user A.

The OTT A client sends choice information of the user A to the OTT interworking platform server by using the OTT A server.

The OTT interworking platform server adds all or some OTT account numbers of the user B into the friend list of the user A according to the choice information of the user A, thereby completing a friend adding operation.

After completing adding of the friend of the user A, the OTT interworking platform server returns information about an adding result to the OTT A client by using the OTT A server.

If the adding is successful, the OTT A server updates the friend list of the user A on the OTT A server in a synchronous manner. That is, the OTT server may also have a cross-OTT friend management function.

The user A may further add another friend user C (a user of OTT C) into the friend list in a same manner.

When the user A chooses to delete another user B from the friend list, the user A performs a deleting operation in an interface of the OTT A client.

The OTT A client notifies, by using the OTT A server, the OTT interworking platform server of information related to deleting, by the user A, the user B.

The OTT interworking platform server deletes information related to the user B from the friend list of the user A, thereby completing the deleting operation. Afterwards, a deleting result may be sent to the OTT A client by using the OTT A server.

If the deleting is successful, the OTT A server may update the friend list of the user A on the OTT A server in a synchronous manner.

Exemplarily, cross-OTT friend recommending may be that after a cross-OTT friend is added in the foregoing cross-OTT friend adding manner, the OTT interworking platform server recommends another cross-OTT friend to a user according to an association relationship of friends that is obtained after the adding.

When interworking between different OTTs is communication between different OTT users, the cross-OTT service request may be a cross-OTT communication request, and the information about the target user may be information about a peer user with whom the OTT user requests to perform cross-OTT communication; the obtaining OTT information of a target user includes: obtaining, according to the information about the peer user with whom the OTT user requests to perform the cross-OTT communication, OTT account information of the peer user with whom the OTT user requests to perform the cross-OTT communication; and the performing an interworking processing operation between cross-OTT friends according to the obtained OTT information of the target user may include: acquiring, according to the obtained OTT account information of the peer user with whom the OTT user requests to perform the cross-OTT communication, information about an OTT server that the peer user with whom the OTT user requests to perform the cross-OTT communication currently logs in to; and sending, according to the obtained information about the OTT server, the communication request to the OTT server that the peer user with whom the OTT user requests to perform the cross-OTT communication currently logs in to or an OTT interworking platform client used for a login of the peer user with whom the OTT user requests to perform the cross-OTT communication, so as to implement the cross-OTT communication.

For example, the user A of the OTT A service logs in by using the OTT interworking platform client, and when the user A needs to communicate with a user of another OTT service, for example, the user B of the OTT B service, the user A may click/tap the user B in an existing friend list in an operation interface of the OTT interworking platform client, or enter an OTT identity of the user B in the operation interface. The OTT identity may be a complete account number on the OTT B, or may be a nickname; and a corresponding OTT name may be selected (for example, "linda" is entered, and an OTT name "microblog" is selected).

The OTT interworking platform client sends, to the OTT interworking platform server, a communication request, for example, a voice call request/file transfer request or merely one direct message, which carries the OTT information of the user B.

After receiving the communication request, the OTT interworking platform server finds an OTT server that the user B currently logs in to, for example, the OTT B server, where when the user B logs in by using the OTT interworking platform client, the user B logs in to the OTT interworking platform server.

Afterwards, the OTT interworking platform server sends the communication request to the OTT server that the user B logs in to, so as to complete a corresponding function, for example, establish a call connection; or the OTT interworking platform server directly forwards the direct message/information to the OTT interworking platform client that the user B logs in to, and the OTT interworking platform completes a corresponding communication function.

The OTT B server or the OTT interworking platform server may send, to the client that the user B logs in to, the direct message sent by the user A, or establish a call connection between the user A and the user B completely in accordance with the prior art.

For another example, the user A of the OTT A service logs in by using the OTT A client, and when the user A needs to communicate with a user of another OTT service, for example, the user B of the OTT B service, the user A may click/tap the user B in an existing friend list in an operation interface of the OTT A client, or enter an OTT identity of the user B in the operation interface. The OTT identity may be a complete account number on the OTT B, or may be a nickname; and a corresponding OTT name may be selected (for example, "linda" is entered, and an OTT name "microblog" is selected).

The OTT A client sends, to the OTT A server, a call request or an offline (offline) message that carries the OTT information of the user B. The OTT A server then sends a related request to the OTT interworking platform server.

If the request sent by the OTT A server to the OTT interworking platform server is a request for acquiring OTT online information of the user B, the OTT interworking platform server finds the online information of the user B, including address information of the server that the user B currently logs in to, and then sends the found information to the OTT A server.

It should be noted that before the step of obtaining the information about the OTT server that the user B currently logs in to, the OTT A server may not send the request, but obtain the information from the OTT interworking platform server. For example, when learning that the user B logs in to the OTT B server, the OTT interworking platform server actively notifies the OTT A server of the information; or when the user A goes online, the OTT A server acquires friend online status information of the user A from the OTT interworking platform server, and subsequently, the OTT A server contacts the OTT B server and completes a subsequent process of connection establishment.

Alternatively, if the request sent by the OTT A server to the OTT interworking platform server is a call request of the user A and the user B or a request for acquiring the online information of the user B, after finding the online information of the user B, including the address information of the server that the user B currently logs in to, the OTT interworking platform server sends the call request or the request for acquiring the online information of the user B to the OTT B server. The OTT B server forwards the call request or the request for acquiring the online information of the user B to the OTT B client used for a login of the user B.

If the request is the call request, the OTT B server may further send a user response to the OTT interworking platform server.

The OTT interworking platform server may establish a connection for a subsequent call, for example, help to establish a communication channel between the OTT A server and the OTT B server, so as to complete the subsequent call connection establishment between the users and convey voice and image information.

It should be noted that when the user B logs in by using the OTT interworking platform client, the user B logs in to the OTT interworking platform server.

In the foregoing example of communication between different OTT users, when not logging in by using an OTT client, a peer user can still implement communication with a local user.

When interworking between different OTTs is information sharing between cross-OTT friends, before the obtaining OTT information of a target user, the method may further include: receiving shared information that is posted by an OTT user and by using an OTT client; the obtaining OTT information of a target user may include: obtaining status information of a user who takes the OTT user as a cross-OTT friend; and the performing an interworking processing operation between cross-OTT friends according to the obtained OTT information of the target user includes: sending, according to the obtained status information by using a push message or in an active request manner, the received shared information to an OTT client used for a login of the user who takes the OTT user as a cross-OTT friend; or sending, according to the obtained status information by using a push message or in an active request manner, the received personal shared information to an OTT server that the user who takes the OTT user as a cross-OTT friend logs in to, so that the OTT server sends the shared information to an OTT client of the user who takes the OTT user as a cross-OTT friend.

For example, the user A logs in by using the OTT interworking platform client, and posts a piece of personal shared information, for example, uploads a photo, a piece of text, a video file, or a content link.

The OTT interworking platform client sends, to the OTT interworking platform server, the information that is posted by the user A.

After receiving the information that is posted by the user A, the OTT interworking platform server searches for all OTT users, for example, the user B and the user C, who take the user A as a friend, uses these users as an information receiving candidate set, and further searches for online statuses of these users, for example, whether these users are online, or which clients are used by these users to log in. It is assumed that the user B logs in by using the OTT interworking platform client, and the user C logs in by using the OTT B client.

The OTT interworking platform server sends, to the OTT B server and the OTT interworking platform client of the user B, the information or a link of the information that is posted by the user A.

When a user who is in the information receiving candidate set is not online, the OTT interworking platform server may choose to save the information, and then send the information to an OTT interworking platform client of the user or a default OTT server of the user after the user goes online.

The OTT B server sends, to an OTT client of the user C, the information or the link of the information that is posted by the user A and sent by the OTT interworking platform server.

It should be noted that a cross-OTT friend of the user B may also log in only by using the OTT interworking platform client. In this case, the foregoing method for sharing with the user B may be used to send, directly to OTT interworking platform clients of all users, the shared information that is posted by the user A.

Conversely, after a friend of the user A posts shared information, the information or a link of the information that is posted by the friend of the user A may also be sent by using the OTT interworking platform server to the OTT interworking platform client of the user A for display, thereby being shared to the user A.

Alternatively, for example, the user A logs in by using the OTT A client, and posts a piece of personal shared information, for example, uploads a photo, a piece of text, a video file, or a content link.

The OTT A client may send, to the OTT interworking platform server by using the OTT A server, the information that is posted by the user A, so that the OTT interworking platform server sends the shared information to a corresponding OTT server or OTT interworking platform client; or after the OTT A client sends, to the OTT A server, the information that is posted by the user A, the OTT A server acquires an information receiving candidate set locally, that is, from the OTT A server, or acquires the information receiving candidate set from the OTT interworking platform server; afterwards, the OTT A server sends, to an OTT server that a user in the candidate set logs in to, the shared information that is posted by the user A.

Exemplarily, the receiving a cross-OTT service request of an OTT user may include: receiving a request of the OTT user for acquiring OTT information of a friend of the OTT user, where the information about the target user is information about the friend of the OTT user; the obtaining OTT information of a target user may include: obtaining the OTT information of the friend of the OTT user according to the information about the friend of the OTT user; and the performing an interworking processing operation between cross-OTT friends according to the obtained OTT information of the target user includes: sending the obtained OTT information of the friend of the OTT user to the OTT user; or sending the obtained OTT information of the friend of the OTT user to an OTT server that the OTT user logs in to.

Exemplarily, the receiving a cross-OTT service request of an OTT user may include: receiving a request of the OTT server that the OTT user logs in to, where the request is used to obtain OTT information of a receiving user of shared information sent by the OTT user, where the information about the target user is the OTT information of the receiving user; and the performing an interworking processing operation between cross-OTT friends according to the obtained OTT information of the target user may include: sending the obtained OTT information of the receiving user to the OTT server that the OTT user logs in to.

For example, when learning that the user B logs in to the OTT B server, the OTT interworking platform server notifies the OTT A server; or after the user A goes online, the OTT A server acquires friend online status information of the user A from the OTT interworking platform server, so that the OTT A server can save and update a cross-OTT friend list and friend status information in a synchronous manner. In this way, the OTT A server can locally acquire friend information of the user A, including information about the cross-OTT friend of the user A, thereby directly sending, to an OTT server that the cross-OTT friend of the user A logs in to, the shared information that is posted by the user A. When the OTT A client sends, to the OTT interworking platform server by using the OTT A server, the information that is posted by the user A, a method for sharing, by the cross-OTT friend of the user A, the information that is posted by the user A is the same as the foregoing method for sharing, to the cross-OTT friend, the information that is posted by the user A who logs in by using the OTT interworking platform client.

When the OTT A client sends, to the OTT A server, the information that is posted by the user A, and the OTT A server can acquire the information receiving candidate set, the OTT A server forwards, to an OTT server that a user in the candidate set logs in to, for example, OTT servers that the users B and C log in to, the information that is posted by A. For the user B, the information that is posted by the user A is forwarded to the OTT interworking platform server; for the user C, the information that is posted by the user A is forwarded to the OTT B server.

Conversely, for the user A, after the user A logs in by using the OTT interworking platform client, latest personal shared information that is posted by any friend of the user A can be sent by an OTT server of the friend of the user A to the client of the user A for display, thereby being shared to the user A.

In the foregoing information sharing embodiment, the OTT user can not only view personal information that is posted by a friend within a same OTT service, but can also receive information that is posted by a cross-OTT friend. In addition, the personal information that is posted by the user A may also be displayed on all OTT clients of all user who take the user A as a friend, so as to perform sharing. Herein, an OTT client may be an OTT interworking platform client, or may be an extended OTT client.

Exemplarily, when interworking between cross-OTT friends is communication between different OTT users, the receiving a cross-OTT service request of an OTT user may include: receiving a request of the OTT user for establishing a cross-OTT communication group, where the information about the target user is information about all OTT users who are requested to join the cross-OTT communication group; the obtaining OTT information of a target user may include: obtaining, according to the information of the OTT users who are requested to join the cross-OTT communication group, OTT information of all the OTT users who are requested to join the group; and the performing an interworking processing operation between cross-OTT friends according to the OTT information of the target user may include: establishing the communication group of the OTT user according to the obtained OTT information of all the OTT users who are requested to join the cross-OTT communication group, and sending group establishment information to all the OTT users in the communication group or OTT servers that all the OTT users separately log in to.

Alternatively, the cross-OTT service request may further be a group message, where the information that is about the target user and carried by the cross-OTT service request may be the information about all OTT users who are requested to join the cross-OTT communication group. That is, a user may initiate establishment of a group, and the established cross-OTT communication group may include users of different OTT services.

If it is assumed that the user A is an OTT A user, the user B is an OTT B user, and the user C is an OTT C user, the user A may initiate group establishment by the user A, the user B, and the user C to establish a cross-OTT communication group whose members are the user A, the user B, and the user C, thereby performing group communication.

Exemplarily, the received request for establishing the cross-OTT communication group may carry a name of the cross-OTT communication group that the OTT user requests to establish.

Exemplarily, the establishing the cross-OTT communication group of the OTT user according to the obtained OTT information of all the OTT users who are requested to join the cross-OTT communication group may include: saving the name of the cross-OTT communication group that the OTT user requests to establish, and information about all members in the cross-OTT communication group.

When establishing the cross-OTT communication group, the user A logs in by using the OTT A client, so as to implement communication contact with the OTT A server; afterwards, the user A initiates the request for establishing the cross-OTT communication group, where the request carries a list of all OTT friends that are requested to join the to-be established cross-OTT communication group, and the name of the cross-OTT communication group that the OTT user requests to establish.

The user A may initiate the request for establishing the cross-OTT communication group by using the OTT A client, and after the OTT A client sends the request to the OTT A server, the OTT A server sends the request to the OTT interworking platform server.

Alternatively, the user A may log in by using the OTT interworking platform client, and send the request for establishing the cross-OTT communication group directly to the OTT interworking platform server.

After receiving the request for establishing the cross-OTT communication group, the OTT interworking platform server sends, according to the information that is about all the OTT users who are requested to join the cross-OTT communication group and that is carried by the request, a group establishment notification request to OTT servers of all the OTT users who are requested to join the cross-OTT communication group.

Optionally, the OTT interworking platform server may save information about all the members in this group that the user requests to establish, for example, an OTT account number, so as to establish the cross-OTT communication group.

If a user in the cross-OTT communication group logs in by using the OTT interworking platform client, the OTT interworking platform server may send a message to the OTT interworking platform client of the user to notify the user.

An OTT server that receives the notification request sends the received notification request to a corresponding OTT client to notify a user in the group.

When a member in the cross-OTT communication group performs updating, for example, when a user (for example, a user X) in the cross-OTT communication group wants to add another new user (for example, a user Y) into the group, the user X may log in to a server by connecting a client of the user X to the server, and submit, by using the client, an updating request to the server that the user X currently logs in to. The user X may log in by using the OTT interworking platform client, or may log in by using an OTT client. If the user X logs in by using the OTT client, the OTT server that the user X logs in to needs to send, to the OTT interworking platform server, the updating request that is submitted by the user X by using the OTT client. If the user X logs in to the OTT interworking platform server by using the OTT interworking platform client, the user X may submit the updating request directly to the OTT interworking platform server by using the OTT interworking platform client.

After receiving the updating request, the OTT interworking platform server adds the user Y into the cross-OTT communication group according to information that is about the user Y and carried in the updating request, thereby completing a group updating operation. Afterwards, for users who log in by using OTT clients, the OTT interworking platform server sends the group establishment notification request to OTT servers that these users in the group log in to, and the OTT servers that these users log in to send the received notification request to corresponding OTT clients for display to these users. For users who log in by using the OTT interworking platform client, the OTT interworking platform server sends the group establishment notification request to OTT interworking platform clients of these users in the group.

For communication of the established cross-OTT communication group, chatting is used as an example for description.

It is assumed that a user X in the group sends a chat message by using an OTT X client, and the chat message is submitted to a corresponding server, that is, an OTT X server.

Afterwards, the OTT X server interacts with the OTT interworking platform server. Specifically, the OTT X server may acquire, from the OTT interworking platform server, information about OTT servers that all members in the group separately and currently log in to; or the OTT X server may forward the chat message to the OTT interworking platform server.

When the OTT X server acquires, from the OTT interworking platform server, the information about the OTT servers that all the members in the group separately and currently log in to, it may be that the OTT X server obtains the information from the OTT interworking platform server at a previous moment, for example, when learning that a user, for example, the user Y, logs in to an OTT server, the OTT interworking platform server directly notifies the OTT X server.

After the OTT X server obtains the information about the OTT servers that all the members in the group separately and currently log in to, the OTT X server may forward, according to the obtained information about the OTT servers, the chat message to the OTT servers that the members in the group separately and currently log in to; then the OTT servers that all the members separately and currently log in to push, in an existing manner, the chat message to OTT clients corresponding to all the members.

If the OTT X server forwards the chat message to the OTT interworking platform server, the OTT interworking platform server needs to forward the message to the OTT servers that the group members separately and currently log in to, so that the OTT servers push the message to the corresponding clients in an existing manner. If a user logs in by using the OTT interworking platform client, the OTT interworking platform server may deliver the chat message directly to the OTT interworking platform client of the user.

Figure 15:
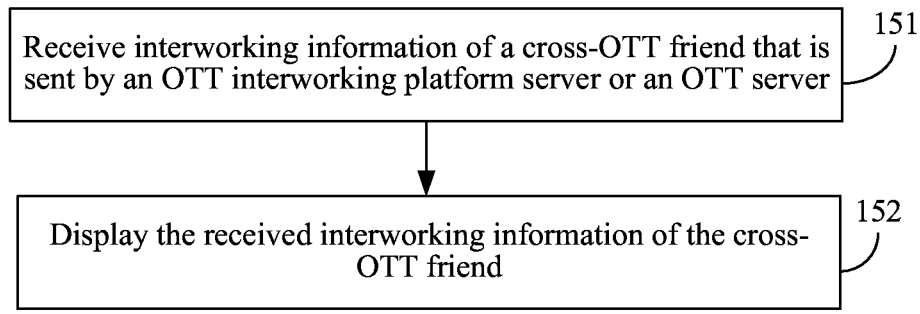
FIG. 15 is a flowchart of a method for interworking between different OTTs according to another embodiment.

FIG. 15 is a flowchart of a method for interworking between different OTTs according to another embodiment of the present invention. The method shown in this embodiment is a processing procedure on a side of an OTT client or an OTT interworking platform client and may include:

Step 151: Receive interworking information of a cross-OTT friend that is sent by an OTT interworking platform server or an OTT server.

Step 152: Display the received interworking information of the cross-OTT friend.

Exemplarily, before step 151, the method may further include: sending a cross-OTT service request to the OTT interworking platform server or the OTT server, so that the OTT interworking platform server or the OTT server returns the interworking information of the cross-OTT friend according to the cross-OTT service request.

Exemplarily, the cross-OTT service request may be a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group; the interworking information of the cross-OTT friend may be information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend; and the displaying the received interworking information of the cross-OTT friend may include: displaying the information for recommending the cross-OTT friend, the online status information of the cross-OTT friend, the OTT information of a user to be added as a cross-OTT friend, the shared information that is posted by the cross-OTT friend, the OTT information of a friend of an OTT user, the information about an OTT user who is allowed to receive the shared information sent by the OTT user, or information about the cross-OTT communication group.

Exemplarily, after step 152, the method may further include: sending acknowledgment information of the user to the OTT interworking platform server or the OTT server.

Figure 16:
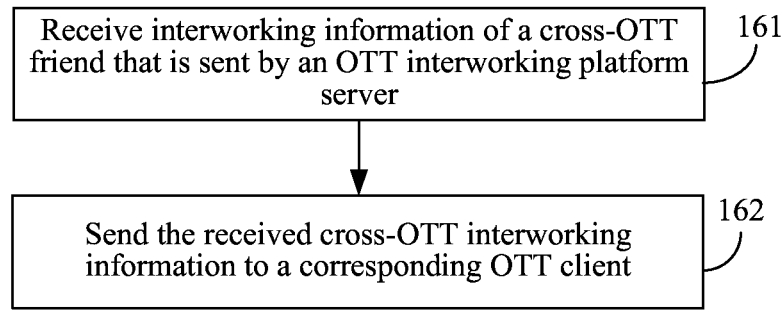
FIG. 16 is a flowchart of a method for interworking between different OTTs according to another embodiment.

FIG. 16 is a flowchart of a method for interworking between different OTTs according to another embodiment. The method shown in this embodiment is a processing procedure on a side of an OTT server and includes the following steps.

Step 161: Receive interworking information of a cross-OTT friend that is sent by an OTT interworking platform server.

Step 162: Send the received cross-OTT interworking information to a corresponding OTT client.

Exemplarily, before step 161, the method may further include: receiving a cross-OTT service request sent by the OTT client; and sending the received cross-OTT service request to the OTT interworking platform server, so that the OTT interworking platform server returns the interworking information of the cross-OTT friend according to the cross-OTT service request.

Exemplarily, the cross-OTT service request may be a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who can receive shared information sent by the OTT user, or a request for establishing a cross-OTT communication group; and the interworking information of the cross-OTT friend may be information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who can receive the shared information sent by the OTT user, a result of establishing the cross-OTT communication group, or a result of adding the cross-OTT friend.

Exemplarily, after the sending the received cross-OTT interworking information to a corresponding OTT client, the method may further include: receiving acknowledgment information of the OTT user that is sent by the OTT client; and sending the received acknowledgment information to the OTT interworking platform server.

Figure 17:
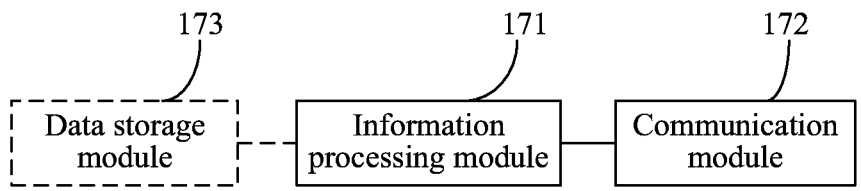
FIG. 17 is a schematic structural diagram of an OTT interworking platform server according to another embodiment.

FIG. 17 is a schematic structural diagram of an OTT interworking platform server according to another embodiment. The server shown in this embodiment is configured to implement the method shown in FIG. 1 and includes: an information processing module 171, configured to obtain OTT information of a target user; and a communication module 172, configured to perform an interworking processing operation between cross-OTT friends according to the OTT information of the target user that is obtained by the information processing module 171.

Exemplarily, the server provided in this embodiment may further include a data storage module 173, which is configured to store OTT information of users of different OTT services; for example, a user information database may be set in the data storage module 173. The database may store information about different OTT account numbers of the users. For example, when a user registers a new OTT account number, the database may refresh and save the new OTT account number that is registered by the user.

A way to acquire the new OTT account number is related to a method used by the user to register the new account number. For example, if the user registers the new account number directly by using an OTT interworking platform client, the account number is directly provided by the OTT interworking platform client; if the user registers the new account number by using an OTT server (for example, a QQ server), the account number may be provided by the OTT server, or may be provided by the user.

The database may further store a friendship list of a user.

When a user A adds an OTT account number of another user B as a friend, the OTT account number of the another user B may be added into the friendship list of the user A. A functional entity that executes new friend adding for the user may be an OTT server, or may be the OTT interworking platform server. Correspondingly, a new friendship of the user may further be acquired by the OTT interworking platform server from an OTT server with which the user registers (even is notified by the user), or may be directly provided by the OTT interworking platform server for the OTT server.

The data storage module 173 may further store group management information, where the group management information includes a name and member information of a cross-OTT communication group.

Exemplarily, in the user information database, a name of a group joined by a user may be added into OTT account information of the user who joins the group.

The data storage module 173 may further store online status information of a user. A temporary database may be set in the data storage module 173, so as to store current online status information of each user.

Exemplarily, the information processing module 171 may obtain the OTT information of the target user from the OTT information that is stored by the data storage module 173.

For example, the information processing module 171 may make information about an OTT account number of a user open.

When the OTT interworking platform server receives an OTT friend query message from UE, the information processing module 171 can find an OTT account number record of a user according to identity information of the user that is carried in the query message; then after the information processing module 171 finds the record, the OTT interworking platform server returns one or one group of found OTT account numbers of the user to the UE.

When the OTT interworking platform server receives a friend query message sent by an OTT server that UE logs in to, the information processing module 171 can find an OTT account number record of a user according to identity information of the user that is carried in the query message; then after the information processing module 171 finds the record, the OTT interworking platform server returns one or one group of found OTT account numbers of the user to the OTT server.

The information processing module 171 may further have a function of making a friendship of a user open.

When a user posts information that needs to be shared to a friend, for example, a microblog, an OTT server that UE currently logs in to needs to determine a name list of information receivers, and the name list of the information receivers needs to be exported from a friendship list. In this case, the OTT interworking platform server may make the friendship list of the user open to the OTT server, so that the OTT server exports the name list of the information receivers from the friendship list; or after the information processing module 171 exports the name list of the information receivers according to the friendship list, the OTT interworking platform server may send the name list of the information receivers to the OTT server.

After the friendship of the user is refreshed, a refreshed friendship needs to be shared to the OTT server that the user logs in to, so that the OTT server determines a subsequent information receiver according to a new friendship list, and may further recommend a new friend to a user according to an association relationship, and the like.

Alternatively, after the friendship of the user is refreshed, an interworking platform directly derives new friend recommending information according to the association relationship and sends the new friend recommending information to the OTT server.

The information processing module 171 may further have a function of making the online status information of the user open.

For example, online status information of a user (whether and where the user goes online) is shared to all OTT friends that follow the user, so that these friends learn about an online status of the user.

For another example, the online status information of the user (whether and where the user goes online) is shared to the OTT server, so that the OTT server extends more cross-OTT interworking functions.

The information processing module 171 may further have a user service function of the interworking platform client. Implementation of the function is mainly that after logging in by using the OTT interworking platform client, the user obtains a service directly from the OTT interworking platform server.

When a user posts information that is to be shared to a friend, for example, a microblog, the OTT interworking platform server acquires related information. After the information processing module 171 directly exports a name list of information receivers according to a friendship list, the communication module 172 forwards the related information to clients of the receivers or OTT servers that the receivers currently log in to.

The information processing module 171 may further have a new friend recommending function.

For example, after the stored friendship list is refreshed, a new possible relationship is derived according to the association relationship, and a new friend is recommended to a user. For example, if other friends of a user jointly develop a new user as a friend, this new user may be recommended to the user. Sending of a recommending message may be executed by the communication module 172.

The information processing module 171 may further have a group management function. For example, after the communication module 172 receives a group establishment request from the user or the OTT server, the information processing module 171 completes a group establishment operation and adds group information into the user account information, and after completing group establishment, notifies all users in a group or OTT servers that the users log in to. A notification request message is sent by the communication module 172.

The information processing module 171 may further have a user identity management function, for example, manages information about all OTT account numbers of the OTT user, including an account number, an OTT that the OTT user registers with, and the like.

For another example, the information processing module 171 acquires a request of a client or an OTT server according to the communication module 172 or the OTT server.

For another example, the information processing module 171 queries an OTT account number or all OTT account numbers of an OTT user according to the request of the client or the OTT server.

The communication module 172 sends a query result to the client or the OTT server.

The information processing module 171 may further have an OTT friend management function, for example, manages all OTT friends of the user, including the friend information list.

The information processing module 171 may further connect to the communication module 172, so as to acquire a related request of the user for friend deleting, adding, or communication.

The information processing module 171 may further delete or add an OTT friend for a user according to a request, or query related information of a friend (including information about an OTT client/server that the friend currently logs in to).

The communication module 172 feeds back a processing result to a client or an OTT server.

The information processing module 171 may further have a user status information management function, for example, manages online statuses of all users (whether the users go online, clients/servers that the users currently log in to), and acquires go-online or go-offline information of the users. The communication module 172 sends corresponding information to a client or an OTT server.

The communication module 172 may interact with the OTT interworking platform client, for example, receive a request of the client, and direct a related processing function to a corresponding functional module, for example, the information processing module, according to the request; and forward a processing result to the client.

The communication module 172 may further communicate with the OTT server, for example, receive a request of the OTT server, and direct a related processing function to a corresponding functional module, for example, the information processing module, according to the request; and forward a processing result to the OTT server.

Exemplarily, the information processing module 171 is specifically configured to obtain the OTT information of the target user according to at least one association relationship of an association relationship between intra-OTT friends of an OTT user and an association relationship between cross-OTT friends of the OTT user; and the communication module 172 is specifically configured to send, by using a push message, the OTT information of the target user that is obtained by the information processing module 171 to the OTT user or an OTT server that the OTT user logs in to, where the OTT information of the target user is used for recommending a new cross-OTT friend or a new intra-OTT friend to the OTT user; or the information processing module 171 is specifically configured to obtain online status information of the target user; and the communication module 172 is specifically configured to: send the online status information of the target user that is obtained by the information processing module 171 to a user who takes the target user as a cross-OTT friend; or send the online status information of the target user that is obtained by the information processing module 171 to an OTT server that a user who takes the target user as a cross-OTT friend logs in to.

Exemplarily, the information processing module 171 is specifically configured to: obtain go-online information or go-offline information of the target user; or obtain go-online information of the target user and information about an OTT that the target user logs in to; or obtain offline information of the target user and information about an OTT that the target user logs in to.

Exemplarily, the communication module 172 is further configured to: before the information processing module 171 obtains the OTT information of the target user, receive a cross-OTT service request of an OTT user, where the cross-OTT service request carries information about the target user; and the information processing module 171 is specifically configured to obtain the OTT information of the target user according to the information about the target user, where the OTT information includes an OTT account number.

Exemplarily, the cross-OTT service request received by the communication module 172 is a request for adding a cross-OTT friend, where the information about the target user includes information about a user to be added as a cross-OTT friend; the information processing module 171 is specifically configured to obtain, according to the information about the user to be added as a cross-OTT friend, OTT account information of the user to be added as a cross-OTT friend; and the communication module 172 is specifically configured to add into an OTT friend list of the OTT user according to the obtained OTT account information of the user to be added as a cross-OTT friend, an OTT account number of the user to be added as a cross-OTT friend.

Exemplarily, the communication module 172 is further configured to: before receiving the cross-OTT service request of the OTT user, receive a query request of the OTT user, where the query request is used to query the OTT account information of the user to be added as a cross-OTT friend; the information processing module 171 is further configured to obtain, according to the query request, the OTT account information of the user to be added as a cross-OTT friend; and the communication module 172 is further configured to send, to the OTT user or a server that the OTT user logs in to, the obtained OTT account information of the user to be added as a cross-OTT friend.

Exemplarily, the communication module 172 is further configured to: before the information processing module 171 adds, into the OTT friend list of the OTT user, the OTT account number of the user to be added as a cross-OTT friend, send, to the OTT user or an OTT server that the OTT user logs in to, the OTT account information of the user to be added as a cross-OTT friend; receive acknowledgment information returned by the OTT user or the OTT server that the OTT user logs in to, where the acknowledgment information includes information for adding, as friends, all or some OTT account numbers of the user to be added as a cross-OTT friend; and add, into the OTT friend list of the OTT user according to the information for adding, as friends, all or some OTT account numbers of the user to be added as a cross-OTT friend, all or some OTT account numbers of the user to be added as a cross-OTT friend.

Exemplarily, the cross-OTT service request received by the communication module 172 is a cross-OTT communication request, and the information about the target user is information about a peer user with whom the OTT user requests to perform cross-OTT communication; the information processing module 171 is specifically configured to: obtain, according to the information about the peer user with whom the OTT user requests to perform the cross-OTT communication, OTT account information of the peer user with whom the OTT user requests to perform the cross-OTT communication; and acquire, according to the obtained OTT account information of the peer user with whom the OTT user requests to perform the cross-OTT communication, information about an OTT server that the peer user with whom the OTT user requests to perform the cross-OTT communication currently logs in to; and the communication module 172 is further configured to send, according to the obtained information about the OTT server, the communication request to the OTT server that the peer user with whom the OTT user requests to perform the cross-OTT communication currently logs in to or an OTT interworking platform client used for a login of the peer user with whom the OTT user requests to perform the cross-OTT communication, so as to implement the cross-OTT communication.

Exemplarily, the communication module 172 is further configured to: before the information processing module obtains the OTT information of the target user, receive shared information that is posted by an OTT user and by using an OTT client; the information processing module 171 is specifically configured to: obtain status information of a user who takes the OTT user as a cross-OTT friend; and the communication module 172 is further configured to: send, according to the obtained status information by using a push message or in an active request manner, the received shared information to an OTT client used for a login of the user who takes the OTT user as a cross-OTT friend; or send, according to the obtained status information by using a push message or in an active request manner, the received shared information to an OTT server that the user who takes the OTT user as a cross-OTT friend logs in to, so that the OTT server sends the shared information to an OTT client of the user who takes the OTT user as a cross-OTT friend.

Exemplarily, the communication module 172 is specifically configured to receive a request of the OTT user for acquiring OTT information of a friend of the OTT user, where the information about the target user is information about the friend of the OTT user; the information processing module 171 is specifically configured to obtain the OTT information of the friend of the OTT user according to the information about the friend of the OTT user; and the communication module 172 is further configured to: send the obtained OTT information of the friend of the OTT user to the OTT user; or send the obtained OTT information of the friend of the OTT user to an OTT server that the OTT user logs in to.

Exemplarily, the communication module 172 is specifically configured to receive a request of an OTT server that the OTT user logs in to, where the request is used to obtain OTT information of a receiving user of shared information sent by the OTT user, where the information about the target user is the OTT information of the receiving user; and the communication module 172 is further configured to send the obtained OTT information of the receiving user to the OTT server that the OTT user logs in to.

Exemplarily, the communication module 172 is specifically configured to receive a request of the OTT user for establishing a cross-OTT communication group, where the information about the target user is information about all OTT users who are requested to join the cross-OTT communication group; the information processing module 171 is specifically configured to: obtain, according to the information of the OTT users who are requested to join the cross-OTT communication group, OTT information of all the OTT users who are requested to join the group; and establish the cross-OTT communication group of the OTT user according to the obtained OTT information of all the OTT users who are requested to join the cross-OTT communication group; and the communication module 172 is further configured to send group establishment information to all the OTT users in the communication group or OTT servers that all the OTT users separately log in to.

Exemplarily, the request that is for establishing the cross-OTT communication group and received by the communication module 172 further carries a name of the cross-OTT communication group that the OTT user requests to establish.

Exemplarily, the information processing module 171 is specifically configured to: save the name of the cross-OTT communication group that the OTT user requests to establish, and information about all members in the cross-OTT communication group.

Exemplarily, the communication module 172 is specifically configured to receive the OTT service request of the OTT user by using an OTT server or an OTT interworking platform client.

Figure 18:
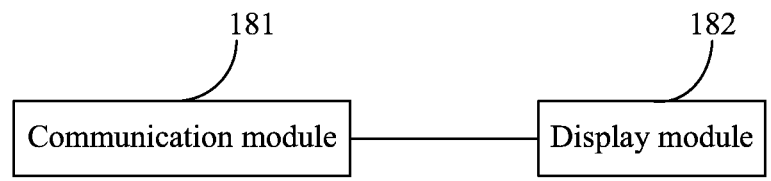
FIG. 18 is a schematic structural diagram of an apparatus for interworking between different OTTs according to another embodiment.

FIG. 18 is a schematic structural diagram of an apparatus for interworking between different OTTs according to another embodiment of the present invention. The apparatus shown in this embodiment is configured to implement the method shown in FIG. 15 and includes: a communication module 181, configured to receive interworking information of a cross-OTT friend that is sent by an OTT interworking platform server or an OTT server; and a display module 182, configured to display the interworking information of the cross-OTT friend that is received by the communication module 181.

Exemplarily, the communication module 181 is further configured to: before receiving the interworking information of the cross-OTT friend that is sent by the OTT interworking platform server or the OTT server, send a cross-OTT service request to the OTT interworking platform server or the OTT server, so that the OTT interworking platform server or the OTT server returns the interworking information of the cross-OTT friend according to cross-OTT service request.

Exemplarily, the cross-OTT service request received by the communication module 181 is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group; the interworking information of the cross-OTT friend that is received by the communication module 181 is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend. The display module 182 is specifically configured to display the information for recommending the cross-OTT friend, the online status information of the cross-OTT friend, the OTT information of a user to be added as a cross-OTT friend, the shared information that is posted by the cross-OTT friend, the OTT information of a friend of an OTT user, the information about an OTT user who is allowed to receive the shared information sent by the OTT user, or information about the cross-OTT communication group.

Exemplarily, the communication module 181 is further configured to: after the display module displays the OTT information of a user to be added as a cross-OTT friend, send acknowledgment information of the user to the OTT interworking platform server or the OTT server.

Exemplarily, the apparatus may be an OTT client or an OTT interworking platform client.

When the apparatus is the OTT interworking platform client, the display module 182 may be implemented by using a user operation interface. The user operation interface may include a function of displaying a cross-OTT friend list, may display the friend list and a current status, and has a function of a cross-OTT friend querying, adding, or deleting operation, and a cross-OTT friend recommending and displaying function.

A communication request may be directly initiated to a cross-OTT friend by using the user operation interface.

The user operation interface may further display a direct message or information of the cross-OTT friend, and shared information that is posted by the cross-OTT friend.

The communication module 181 may send, to the OTT interworking platform server, an operation request from the user interface, receive information from the OTT interworking platform server, and forward the information to the user interface for display.

When the apparatus is the OTT client, the display module 182 may be implemented by using the user operation interface.

The user operation interface may display a cross-OTT friend list and a current status of a cross-OTT friend, display a message for recommending the cross-OTT friend, a direct message/information of the cross-OTT friend, shared information that is posted by the cross-OTT friend, and the like.

The user operation interface may further provide a function of a cross-OTT friend querying/adding/deleting operation, and a function of initiating cross-OTT friend communication.

The communication module 181 may send, to the OTT server, an operation request from the user interface, receive information from the OTT server, and forward the information to the user interface for display.

Figure 19:
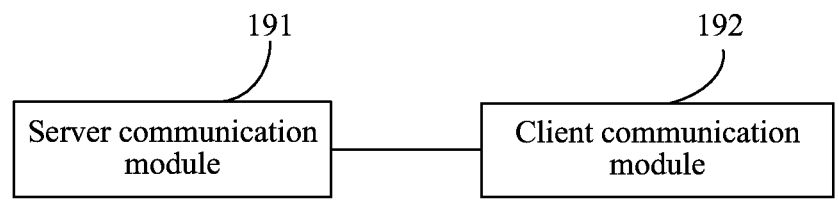
FIG. 19 is a schematic structural diagram of an OTT server according to another embodiment.

FIG. 19 is a schematic structural diagram of an OTT server according to another embodiment. The server shown in this embodiment is configured to implement the method shown in FIG. 16 and includes: a server communication module 191, configured to receive interworking information of a cross-OTT friend that is sent by an OTT interworking platform server; and a client communication module 192, configured to send the cross-OTT interworking information received by the server communication module 191 to a corresponding OTT client. The client communication module 192 may further acquire information sent from a user side, forward related information to a corresponding module, and forward, to a client, information sent by each module to the user.

Exemplarily, the client communication module 192 is further configured to: before the server communication module 191 receives the interworking information of the cross-OTT friend that is sent by the OTT interworking platform server, receive a cross-OTT service request sent by the OTT client; and the server communication module 191 is further configured to send the cross-OTT service request received by the client communication module 192 to the OTT interworking platform server, so that the OTT interworking platform server returns the interworking information of the cross-OTT friend according to the cross-OTT service request.

Exemplarily, the cross-OTT service request received by the client communication module 192 is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who can receive shared information sent by the OTT user, or a request for establishing a cross-OTT communication group; and the interworking information of the cross-OTT friend that is received by the server communication module 191 is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who can receive the shared information sent by the OTT user, a result of establishing the cross-OTT communication group, or a result of adding the cross-OTT friend.

Exemplarily, the client communication module 192 is further configured to: after sending the received cross-OTT interworking information to the corresponding OTT client, receive acknowledgment information of the OTT user that is sent by the OTT client; and the server communication module 191 is further configured to send the received acknowledgment information to the OTT interworking platform server.

In addition, the OTT server may further include a user's cross-OTT friend management module, so as to manage all OTT friends of the user, including a friend information list.

The user's cross-OTT friend management module may further connect to the client communication module 192 or the server communication module 191, so as to acquire a related request of the user for friend querying, deleting, adding, or communication.

The user's cross-OTT friend management module may further communicate with the OTT interworking platform server, and process a corresponding function required for the request of the user for a friend querying, adding, or deleting function, for example, acquire information about an OTT account number of a friend that the user requests to query/update, in a synchronous manner, a friend list of the user after friend adding and deleting/acquire cross-OTT friend information of the user (including a friend of the user and a user who takes the user as a friend), where the information includes information about an OTT client/server that the friend currently logs in to; and feed back a processing result to the client communication module 192.

According to the methods and the devices provided in the foregoing embodiments, a user needs neither to apply for multiple OTT account numbers, nor to log in to multiple OTT systems, and can communicate with all OTT friends of the user in real time, for example, implement displaying of a cross-OTT friend list and a status of a cross-OTT friend, perform communication contact with the cross-OTT friend in real time, and learn about latest information that is posted by all cross-OTT friends. This effectively resolves a problem that without applying for some OTT accounts, the user loses a chance to contact users who use these OTT applications. In addition, because an OTT user does not need to enable a corresponding OTT client only for implementation of communication with some OTT friends, a user terminal can save a large amount of power that is consumed when a client and a server constantly keep heartbeat packet association, which helps to reduce energy consumption.

Figure 20:
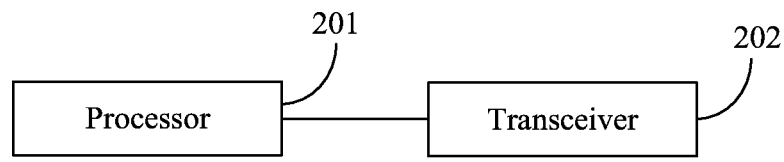
FIG. 20 is a schematic structural diagram of an OTT interworking platform server according to another embodiment.

FIG. 20 is a schematic structural diagram of an OTT interworking platform server according to another embodiment. The server shown in this embodiment is configured to implement the method shown in FIG. 1 and includes: a processor 201, configured to obtain OTT information of a target user; and a transceiver 202, configured to perform an interworking processing operation between cross-OTT friends according to the OTT information of the target user that is obtained by the processor 201.

Exemplarily, the processor 201 is specifically configured to obtain the OTT information of the target user according to at least one association relationship of an association relationship between intra-OTT friends of an OTT user and an association relationship between cross-OTT friends of the OTT user; and the transceiver 202 is specifically configured to send, by using a push message, the OTT information of the target user that is obtained by the processor 201 to the OTT user or an OTT server that the OTT user logs in to, where the OTT information of the target user is used for recommending a new cross-OTT friend or a new intra-OTT friend to the OTT user; or the processor 201 is specifically configured to obtain online status information of the target user; and the transceiver 202 is specifically configured to: send the online status information of the target user that is obtained by the processor 201 to a user who takes the target user as a cross-OTT friend; or send the online status information of the target user that is obtained by the processor 201 to an OTT server that a user who takes the target user as a cross-OTT friend logs in to.

Exemplarily, the processor 201 is specifically configured to: obtain go-online information or go-offline information of the target user; or obtain go-online information of the target user and information about an OTT that the target user logs in to; or obtain offline information of the target user and information about an OTT that the target user logs in to.

Exemplarily, the transceiver 202 is further configured to: before the processor 201 obtains the OTT information of the target user, receive a cross-OTT service request of an OTT user, where the cross-OTT service request carries information about the target user; and the processor 201 is specifically configured to obtain the OTT information of the target user according to the information about the target user, where the OTT information includes an OTT account number.

Exemplarily, the cross-OTT service request received by the transceiver 202 is a request for adding a cross-OTT friend, where the information about the target user includes information about a user to be added as a cross-OTT friend; the processor 201 is specifically configured to obtain, according to the information about the user to be added as a cross-OTT friend, OTT account information of the user to be added as a cross-OTT friend; and the transceiver 202 is specifically configured to add into an OTT friend list of the OTT user according to the obtained OTT account information of the user to be added as a cross-OTT friend, an OTT account number of the user to be added as a cross-OTT friend.

Exemplarily, the transceiver 202 is further configured to: before receiving the cross-OTT service request of the OTT user, receive a query request of the OTT user, where the query request is used to query the OTT account information of the user to be added as a cross-OTT friend; the processor 201 is further configured to obtain, according to the query request, the OTT account information of the user to be added as a cross-OTT friend; and the transceiver 202 is further configured to send, to the OTT user or a server that the OTT user logs in to, the obtained OTT account information of the user to be added as a cross-OTT friend.

Exemplarily, the transceiver 202 is further configured to: before the processor 201 adds, into the OTT friend list of the OTT user, the OTT account number of the user to be added as a cross-OTT friend, send, to the OTT user or an OTT server that the OTT user logs in to, the OTT account information of the user to be added as a cross-OTT friend; receive acknowledgment information returned by the OTT user or the OTT server that the OTT user logs in to, where the acknowledgment information includes information for adding, as friends, all or some OTT account numbers of the user to be added as a cross-OTT friend; and add, into the OTT friend list of the OTT user according to the information for adding, as friends, all or some OTT account numbers of the user to be added as a cross-OTT friend, all or some OTT account numbers of the user to be added as a cross-OTT friend.

Exemplarily, the cross-OTT service request received by the transceiver 202 is a cross-OTT communication request, and the information about the target user is information about a peer user with whom the OTT user requests to perform cross-OTT communication; the processor 201 is specifically configured to: obtain, according to the information about the peer user with whom the OTT user requests to perform the cross-OTT communication, OTT account information of the peer user with whom the OTT user requests to perform the cross-OTT communication; acquire, according to the obtained OTT account information of the peer user with whom the OTT user requests to perform the cross-OTT communication, information about an OTT server that the peer user with whom the OTT user requests to perform the cross-OTT communication currently logs in to; and the transceiver 202 is further configured to send, according to the obtained information about the OTT server, the communication request to the OTT server that the peer user with whom the OTT user requests to perform the cross-OTT communication currently logs in to or an OTT interworking platform client used for a login of the peer user with whom the OTT user requests to perform the cross-OTT communication, so as to implement the cross-OTT communication.

Exemplarily, the transceiver 202 is further configured to: before the processor 201 obtains the OTT information of the target user, receive shared information that is posted by an OTT user and by using an OTT client; the processor 201 is specifically configured to: obtain status information of a user who takes the OTT user as a cross-OTT friend; and the transceiver 202 is further configured to: send, according to the obtained status information by using a push message or in an active request manner, the received shared information to an OTT client used for a login of the user who takes the OTT user as a cross-OTT friend; or send, according to the obtained status information by using a push message or in an active request manner, the received shared information to an OTT server that the user who takes the OTT user as a cross-OTT friend logs in to, so that the OTT server sends the shared information to an OTT client of the user who takes the OTT user as a cross-OTT friend.

Exemplarily, the transceiver 202 is specifically configured to receive a request of the OTT user for acquiring OTT information of a friend of the OTT user, where the information about the target user is information about the friend of the OTT user; the processor 201 is specifically configured to obtain the OTT information of the friend of the OTT user according to the information about the friend of the OTT user; and the transceiver 202 is further configured to: send the obtained OTT information of the friend of the OTT user to the OTT user; or send the obtained OTT information of the friend of the OTT user to an OTT server that the OTT user logs in to.

Exemplarily, the transceiver 202 is specifically configured to receive a request of an OTT server that the OTT user logs in to, where the request is used to obtain OTT information of a receiving user of shared information sent by the OTT user, where the information about the target user is the OTT information of the receiving user; and the transceiver 202 is further configured to send the obtained OTT information of the receiving user to the OTT server that the OTT user logs in to.

Exemplarily, the transceiver 202 is specifically configured to receive a request of the OTT user for establishing a cross-OTT communication group, where the information about the target user is information about all OTT users who are requested to join the cross-OTT communication group; the processor 201 is specifically configured to: obtain, according to the information of the OTT users who are requested to join the cross-OTT communication group, OTT information of all the OTT users who are requested to join the group; and establish the cross-OTT communication group of the OTT user according to the obtained OTT information of all the OTT users who are requested to join the cross-OTT communication group; and the transceiver 202 is further configured to send group establishment information to all the OTT users in the communication group or OTT servers that all the OTT users separately log in to.

Exemplarily, the request that is for establishing the cross-OTT communication group and received by the transceiver 202 further carries a name of the cross-OTT communication group that the OTT user requests to establish.

Exemplarily, the processor 201 is specifically configured to: save the name of the cross-OTT communication group that the OTT user requests to establish, and information about all members in the cross-OTT communication group.

Exemplarily, the transceiver 202 is specifically configured to receive the cross-OTT service request of the OTT user by using an OTT server or an OTT interworking platform client.

Figure 21:
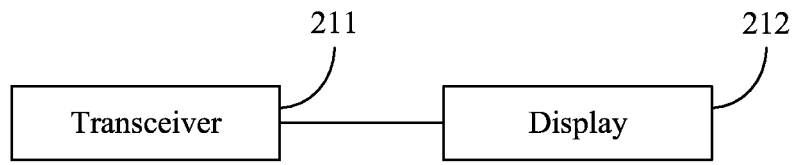
FIG. 21 is a schematic structural diagram of an apparatus for interworking between different OTTs according to another embodiment.

FIG. 21 is a schematic structural diagram of an apparatus for interworking between different OTTs according to another embodiment of the present invention. The apparatus shown in this embodiment is configured to implement the method shown in FIG. 15 and includes: a transceiver 211, configured to receive interworking information of a cross-OTT friend that is sent by an OTT interworking platform server or an OTT server; and a display 212, configured to display the interworking information of the cross-OTT friend that is received by the transceiver 211.

Exemplarily, the transceiver 211 is further configured to: before receiving the interworking information of the cross-OTT friend that is sent by the OTT interworking platform server or the OTT server, send a cross-OTT service request to the OTT interworking platform server or the OTT server, so that the OTT interworking platform server or the OTT server returns the interworking information of the cross-OTT friend according to the cross-OTT service request.

Exemplarily, the cross-OTT service request received by the transceiver 211 is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group; the interworking information of the cross-OTT friend that is received by the transceiver 211 is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend; and the display 212 is specifically configured to display the information for recommending the cross-OTT friend, the online status information of the cross-OTT friend, the OTT information of a user to be added as a cross-OTT friend, the shared information that is posted by the cross-OTT friend, the OTT information of a friend of an OTT user, the information about an OTT user who is allowed to receive the shared information sent by the OTT user, or information about the cross-OTT communication group.

Exemplarily, the transceiver 211 is further configured to: after the display 212 displays the OTT information of the user to be added as a cross-OTT friend, send acknowledgment information of the user to the OTT interworking platform server or the OTT server.

Exemplarily, the apparatus is an OTT client or an OTT interworking platform client.

Figure 22:
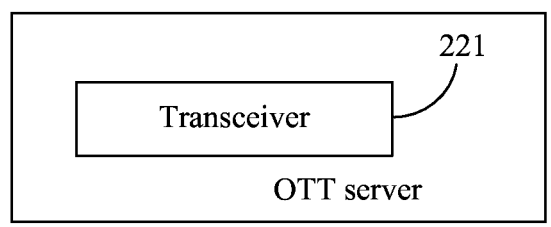
FIG. 22 is a schematic structural diagram of an OTT server according to another embodiment.

FIG. 22 is a schematic structural diagram of an OTT server according to another embodiment. The server shown in this embodiment is configured to implement the method shown in FIG. 16 and includes: a transceiver 221, configured to receive interworking information of a cross-OTT friend that is sent by an OTT interworking platform server; where the transceiver 221 is further configured to send the cross-OTT interworking information received by the transceiver 221 to a corresponding OTT client.

Exemplarily, the transceiver 221 is further configured to: before receiving the interworking information of the cross-OTT friend that is sent by the OTT interworking platform server, receive a cross-OTT service request sent by the OTT client; and the transceiver 221 is further configured to send the received cross-OTT service request to the OTT interworking platform server, so that the OTT interworking platform server returns the interworking information of the cross-OTT friend according to the cross-OTT service request.

Exemplarily, the cross-OTT service request received by the transceiver 221 is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who can receive shared information sent by the OTT user, or a request for establishing a cross-OTT communication group; and the interworking information of the cross-OTT friend that is received by the transceiver 221 is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who can receive the shared information sent by the OTT user, a result of establishing the cross-OTT communication group, or a result of adding the cross-OTT friend.

Exemplarily, the transceiver 221 is further configured to: after sending the received cross-OTT interworking information to the corresponding OTT client, receive acknowledgment information of the OTT user that is sent by the OTT client; and the transceiver 221 is further configured to send the received acknowledgment information to the OTT interworking platform server.

An embodiment further provides a computer program product. The computer program product includes a computer-readable medium, and the readable medium includes a first group of program code, which is used to perform steps in the foregoing method shown in FIG. 1: obtaining OTT information of a target user; and performing an interworking processing operation between cross-OTT friends according to the obtained OTT information of the target user.

Optionally, the obtaining OTT information of a target user includes: obtaining the OTT information of the target user according to at least one association relationship of an association relationship between intra-OTT friends of an OTT user and an association relationship between cross-OTT friends of the OTT user; and the performing an interworking processing operation between cross-OTT friends according to the obtained OTT information of the target user includes: sending, by using a push message, the OTT information of the target user to the OTT user or an OTT server that the OTT user logs in to, where the OTT information of the target user is used for recommending a new cross-OTT friend or a new intra-OTT friend to the OTT user; or the obtaining OTT information of a target user includes: obtaining online status information of the target user; and the performing an interworking processing operation between cross-OTT friends according to the obtained OTT information of the target user includes: sending the online status information of the target user to a user who takes the target user as a cross-OTT friend; or sending the online status information of the target user to an OTT server that a user who takes the target user as a cross-OTT friend logs in to.

Optionally, the obtaining online status information of the target user includes: obtaining go-online information or go-offline information of the target user; or obtaining go-online information of the target user and information about an OTT that the target user logs in to; or obtaining offline information of the target user and information about an OTT that the target user logs in to.

Optionally, before the obtaining OTT information of a target user, the method further includes: receiving a cross-OTT service request of an OTT user, where the cross-OTT service request carries information about the target user; and the obtaining OTT information of a target user includes: obtaining the OTT information of the target user according to the information about the target user, where the OTT information includes an OTT account number.

Optionally, the cross-OTT service request is a request for adding a cross-OTT friend, where the information about the target user includes information about a user to be added as a cross-OTT friend; the obtaining OTT information of a target user includes: obtaining, according to the information about the user to be added as a cross-OTT friend, OTT account information of the user to be added as a cross-OTT friend; and the performing an interworking processing operation between cross-OTT friends according to the obtained OTT information of the target user includes: adding, into an OTT friend list of the OTT user according to the obtained OTT account information of the user to be added as a cross-OTT friend, an OTT account number of the user to be added as a cross-OTT friend.

Optionally, before the receiving a cross-OTT service request of an OTT user, the method further includes: receiving a query request of the OTT user, where the query request is used to query the OTT account information of the user to be added as a cross-OTT friend; obtaining, according to the query request, the OTT account information of the user to be added as a cross-OTT friend; and sending, to the OTT user or a server that the OTT user logs in to, the obtained OTT account information of the user to be added as a cross-OTT friend.

Optionally, before the adding, into an OTT friend list of the OTT user, an OTT account number of the user to be added as a cross-OTT friend, the method further includes: sending, to the OTT user or an OTT server that the OTT user logs in to, the OTT account information of the user to be added as a cross-OTT friend; receiving acknowledgment information returned by the OTT user or the OTT server that the OTT user logs in to, where the acknowledgment information includes information for adding, as friends, all or some OTT account numbers of the user to be added as a cross-OTT friend; and adding, into the OTT friend list of the OTT user according to the information for adding, as friends, all or some OTT account numbers of the user to be added as a cross-OTT friend, all or some OTT account numbers of the user to be added as a cross-OTT friend.

Optionally, the cross-OTT service request is a cross-OTT communication request, and the information about the target user is information about a peer user with whom the OTT user requests to perform cross-OTT communication; the obtaining OTT information of a target user includes: obtaining, according to the information about the peer user with whom the OTT user requests to perform the cross-OTT communication, OTT account information of the peer user with whom the OTT user requests to perform the cross-OTT communication; the performing an interworking processing operation between cross-OTT friends according to the obtained OTT information of the target user includes: acquiring, according to the obtained OTT account information of the peer user with whom the OTT user requests to perform the cross-OTT communication, information about an OTT server that the peer user with whom the OTT user requests to perform the cross-OTT communication currently logs in to; and sending, according to the obtained information about the OTT server, the communication request to the OTT server that the peer user with whom the OTT user requests to perform the cross-OTT communication currently logs in to or an OTT interworking platform client used for a login of the peer user with whom the OTT user requests to perform the cross-OTT communication, so as to implement the cross-OTT communication.

Optionally, before the obtaining OTT information of a target user, the method further includes: receiving shared information that is posted by an OTT user and by using an OTT client; the obtaining OTT information of a target user includes: obtaining status information of a user who takes the OTT user as a cross-OTT friend; the performing an interworking processing operation between cross-OTT friends according to the obtained OTT information of the target user includes: sending, according to the obtained status information by using a push message or in an active request manner, the received shared information to an OTT client used for a login of the user who takes the OTT user as a cross-OTT friend; or sending, according to the obtained status information by using a push message or in an active request manner, the received shared information to an OTT server that the user who takes the OTT user as a cross-OTT friend logs in to, so that the OTT server sends the shared information to an OTT client of the user who takes the OTT user as a cross-OTT friend.

Optionally, the receiving a cross-OTT service request of an OTT user includes: receiving a request of the OTT user for acquiring OTT information of a friend of the OTT user, where the information about the target user is information about the friend of the OTT user; the obtaining OTT information of a target user includes: obtaining the OTT information of the friend of the OTT user according to the information about the friend of the OTT user; and the performing an interworking processing operation between cross-OTT friends according to the obtained OTT information of the target user includes: sending the obtained OTT information of the friend of the OTT user to the OTT user; or sending the obtained OTT information of the friend of the OTT user to an OTT server that the OTT user logs in to.

Optionally, the receiving a cross-OTT service request of an OTT user includes: receiving a request of an OTT server that the OTT user logs in to, where the request is used to obtain OTT information of a receiving user of shared information sent by the OTT user, where the information about the target user is the OTT information of the receiving user; and the performing an interworking processing operation between cross-OTT friends according to the obtained OTT information of the target user includes: sending the obtained OTT information of the receiving user to the OTT server that the OTT user logs in to.

Optionally, the receiving a cross-OTT service request of an OTT user includes: receiving a request of the OTT user for establishing a cross-OTT communication group, where the information about the target user is information about all OTT users who are requested to join the cross-OTT communication group; the obtaining OTT information of a target user includes: obtaining, according to the information of the OTT users who are requested to join the cross-OTT communication group, OTT information of all the OTT users who are requested to join the group; the performing an interworking processing operation between cross-OTT friends according to the OTT information of the target user includes: establishing the cross-OTT communication group of the OTT user according to the obtained OTT information of all the OTT users who are requested to join the cross-OTT communication group, and sending group establishment information to all the OTT users in the communication group or OTT servers that all the OTT users separately log in to.

Optionally, the received request for establishing the cross-OTT communication group further carries a name of the cross-OTT communication group that the OTT user requests to establish.

Optionally, the establishing the cross-OTT communication group of the OTT user according to the obtained OTT information of all the OTT users who are requested to join the cross-OTT communication group includes: saving the name of the cross-OTT communication group that the OTT user requests to establish, and information about all members in the cross-OTT communication group.

Optionally, the receiving a cross-OTT service request of an OTT user includes: receiving the cross-OTT service request of the OTT user by using an OTT server or an OTT interworking platform client.

In addition, an embodiment further provides another computer program product. The computer program product includes a computer-readable medium, and the readable medium includes a second group of program code, which is used to perform steps in the foregoing method shown in FIG. 15: receiving interworking information of a cross-OTT friend that is sent by an OTT interworking platform server or an OTT server; and displaying the received interworking information of the cross-OTT friend.

Optionally, before the receiving interworking information of a cross-OTT friend that is sent by an OTT interworking platform server or an OTT server, the method further includes: sending a cross-OTT service request to the OTT interworking platform server or the OTT server, so that the OTT interworking platform server or the OTT server returns the interworking information of the cross-OTT friend according to the cross-OTT service request.

Optionally, the cross-OTT service request is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who is allowed to receive shared information sent by the OTT user, or a request for establishing a cross-OTT communication group; the interworking information of the cross-OTT friend is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who is allowed to receive the shared information sent by the OTT user, a result of establishing the cross-OTT communication group, or a result of adding the cross-OTT friend; and the displaying the received interworking information of the cross-OTT friend includes: displaying the information for recommending the cross-OTT friend, the online status information of the cross-OTT friend, the OTT information of a user to be added as a cross-OTT friend, the shared information that is posted by the cross-OTT friend, the OTT information of a friend of an OTT user, the information about an OTT user who is allowed to receive the shared information sent by the OTT user, or information about the cross-OTT communication group.

Optionally, after the displaying the OTT information of the user to be added as a cross-OTT friend, the method further includes: sending acknowledgment information of the user to the OTT interworking platform server or the OTT server.

In addition, an embodiment further provides another computer program product. The computer program product includes a computer-readable medium, and the readable medium includes a third group of program code, which is used to perform steps in the foregoing method shown in FIG. 16: receiving interworking information of a cross-OTT friend that is sent by an OTT interworking platform server; and sending the received cross-OTT interworking information to a corresponding OTT client.

Optionally, before the receiving interworking information of a cross-OTT friend that is sent by an OTT interworking platform server, the method further includes: receiving a cross-OTT service request sent by the OTT client; and sending the received cross-OTT service request to the OTT interworking platform server, so that the OTT interworking platform server returns the interworking information of the cross-OTT friend according to the cross-OTT service request.

Optionally, the cross-OTT service request is a request for obtaining status information of the cross-OTT friend, a request for adding the cross-OTT friend, a cross-OTT communication request, a request for sharing shared information that is posted by the cross-OTT friend, a request for acquiring OTT information of a friend of an OTT user, a request for acquiring information about an OTT user who can receive shared information sent by the OTT user, or a request for establishing a cross-OTT communication group; and the interworking information of the cross-OTT friend is information for recommending the cross-OTT friend, online status information of the cross-OTT friend, OTT information of a user to be added as a cross-OTT friend, the shared information that is posted by the cross-OTT friend, the OTT information of a friend of an OTT user, the information about an OTT user who can receive the shared information sent by the OTT user, a result of establishing the cross-OTT communication group, or a result of adding the cross-OTT friend.

Optionally, after the sending the received cross-OTT interworking information to a corresponding OTT client, the method further includes: receiving acknowledgment information of the OTT user that is sent by the OTT client; and sending the received acknowledgment information to the OTT interworking platform server.

With descriptions of the foregoing implementation manners, persons skilled in the art may clearly understand that the present invention may be implemented by hardware, firmware, or a combination of hardware and firmware. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk and disc used by the present invention include a compact disc (CD), a laser disc, an optical disc, a digital versatile disc (DVD), a floppy disk and a Blu-ray disc, where the disk generally copies data in a magnetic manner, and the disc copies data optically by using laser. The foregoing combination should also be included in the protection scope of the computer-readable medium.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features of the technical solutions, without departing from the scope of the technical solutions of the embodiments of the present invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
   receiving a first cross-over the top (OTT) service request of a first OTT user of a first OTT service, wherein the first cross-OTT service request carries information about a target user of a second OTT service, and wherein the first cross-OTT service request is a request for adding the target user as a cross-OTT friend;
   obtaining OTT information of the target user according to an OTT friend list of the first OTT user;
   performing an interworking processing operation between the first OTT user and the target user according to the first cross-OTT service request and the obtained OTT information of the target user, wherein performing the interworking processing operation comprises:
   sending the first cross-OTT service request to the second OTT service according to the obtained OTT information of the target user; and
   adding, to the OTT friend list of the first OTT user, the obtained OTT information of the target user;
   wherein during the performing the interworking processing operation the target user belongs to the second OTT service but does not belong to the first OTT service, and the first OTT user belongs to the first OTT service but does not belong to the second OTT service; and
   sending, in response to adding the obtained OTT information of the target user to the OTT friend list of the first OTT user, a friend recommendation to a second OTT user recommending the target user to the second OTT user, according to an association between the first OTT user and the second OTT user, wherein the association is indicated in the OTT friend list of the first OTT user, and wherein the second OTT user does not belong to the second OTT service.

2. The method according to claim 1, wherein obtaining the OTT information of the target user comprises:
   obtaining the OTT information of the target user according to the information about the target user, wherein the OTT information comprises an OTT account number.

3. The method according to claim 2, further comprising:
   receiving a second cross-OTT service request, wherein the second cross-OTT service request is a cross-OTT communication request, and wherein the second cross-OTT service request carries information about a peer user with whom the first OTT user requests to perform cross-OTT communication;
   obtaining OTT account information of the peer user;
   acquiring, according to the obtained OTT account information of the peer user, information about an OTT server that the peer user currently logs in to; and
   sending, according to the obtained information about the OTT server, the cross-OTT communication request to the OTT server that the peer user currently logs in to or an OTT interworking platform client used for a login of the peer user, so as to implement the cross-OTT communication.

4. The method according to claim 2, further comprising:
receiving a second cross-OTT service request of the first OTT user for acquiring the OTT information of the target user, wherein the target user is a friend of the first OTT user; and
performing another interworking processing operation between the first OTT user and the target user according to the second cross-OTT service request and the obtained OTT information of the target user comprises:
sending the obtained OTT information of the target user to the first OTT user; or
sending the obtained OTT information of the target user to an OTT server that the first OTT user logs in to.

5. The method according to claim 2, further comprising:
receiving a second cross-OTT service request of an OTT server that the first OTT user logs in to, wherein the second cross-OTT service request is used to obtain OTT information of a third user, and wherein the third user is a receiving user of shared information sent by the first OTT user;
performing an interworking processing operation between the first OTT user and the third user according to the second cross-OTT service request and the obtained OTT information of the third user comprises:
sending the obtained OTT information of the third user to the OTT server that the first OTT user logs in to.

6. The method according to claim 2, further comprising:
receiving a second cross-OTT service request of the first OTT user for establishing a cross-OTT communication group, wherein the cross-OTT communication group comprises the target user;
obtaining, according to the OTT friend list of the first OTT user, OTT information of a plurality of OTT users indicated by the second cross-OTT service request;
establishing the cross-OTT communication group of the first OTT user according to the obtained OTT information of the plurality of OTT users indicated by the second cross-OTT service request; and
sending group establishment information to the plurality of OTT users in the cross-OTT communication group or to OTT servers that the plurality of OTT users separately log in to.

7. The method according to claim 2, wherein receiving the first cross-OTT service request of the first OTT user comprises:
receiving the first cross-OTT service request of the first OTT user by using an OTT server or an OTT interworking platform client.

8. The method according to claim 1, wherein:
the obtained OTT information of the target user comprises OTT account information corresponding to OTT services registered by the target user; and
the OTT account information corresponding to an OTT service of the OTT services registered by the target user comprises a username and an account number.

9. The method according to claim 8, wherein the OTT account information corresponding to an OTT service of the OTT services registered by the target user further comprises server information of an OTT server of the OTT service, go-online information of the target user, and go-offline information of the target user.

10. A server, comprising:
a processor; and
a non-transitory computer-readable storage medium storing a program to be executed by the processor, the program including instructions that, when executed by the processor, cause the server to:
receive a first cross-over the top (OTT) service request of an OTT user of a first OTT service, wherein the first cross-OTT service request carries information about a target user of a second OTT service, and wherein the first cross-OTT service request is a request for adding the target user as a cross-OTT friend;
obtain OTT information of the target user according to an OTT friend list of the first OTT user;
perform an interworking processing operation between the first OTT user and the target user according to the first cross-OTT service request and the OTT information of the target user, wherein performing the interworking processing operation comprises:
sending the first cross-OTT service request to the second OTT service according to the OTT information of the target user; and
adding, to the OTT friend list of the first OTT user, the obtained OTT information of the target user;
wherein during the performing the interworking processing operation the target user belongs to the second OTT service but does not belong to the first OTT service, and the first OTT user belongs to the first OTT service but does not belong to the second OTT service; and
send, in response to adding the obtained OTT information of the target user to the OTT friend list of the first OTT user, a friend recommendation to a second OTT user recommending the target user to the second OTT user, according to an association between the first OTT user and the second OTT user, wherein the association is indicated in the OTT friend list of the first OTT user, and wherein the second OTT user does not belong to the second OTT service.

11. The server according to claim 10, wherein the program further includes instructions that, when executed by the processor, cause the server to:
obtain the OTT information of the target user according to the information about the target user, wherein the OTT information comprises an OTT account number.

12. The server according to claim 10, wherein the program further includes instructions that, when executed by the processor, cause the server to:
receive a second cross-OTT service request, wherein the second cross-OTT service request is a cross-OTT communication request, and wherein the second cross-OTT service request carries information about a peer user with whom the first OTT user requests to perform cross-OTT communication;
obtain, according to the information about the peer user, OTT account information of the peer user;
acquire, according to the OTT account information of the peer user, information about an OTT server that the peer user currently logs in to; and
send, according to the information about the OTT server, the cross-OTT communication request to the OTT server that the peer user currently logs in to or an OTT interworking platform client used for a login of the peer user, so as to implement the cross-OTT communication.

13. The server according to claim 10, wherein the program further includes instructions that, when executed by the processor, cause the server to:
receive a second cross-OTT service request of the first OTT user for acquiring the OTT information of the target user, wherein the target user is a friend of the first OTT user; and send the obtained OTT information of the target user to the first OTT user; or send the obtained OTT information of the target user to an OTT server that the first OTT user logs in to.

14. The server according to claim 10, wherein the program further includes instructions that, when executed by the processor, cause the server to:

receive a second cross-OTT service request of an OTT server that the first OTT user logs in to, wherein the second cross-OTT service request is used to obtain the OTT information of the target user, and the target user is a receiving user of shared information sent by the first OTT user; and send the OTT information of the target user to the OTT server that the first OTT user logs in to.

15. The server according to claim 10, wherein the program further includes instructions that, when executed by the processor, cause the server to:

receive a second cross-OTT service request of the first OTT user for establishing a cross-OTT communication group, wherein the cross-OTT communication group comprises the target user, and wherein the second cross-OTT service request comprises information about a plurality of OTT users who are requested to join the cross-OTT communication group;

obtain, according to the OTT friend list of the first OTT user, OTT information of the plurality of OTT users;

establish the cross-OTT communication group of the first OTT user according to the OTT information of the plurality of OTT users; and send group establishment information to the plurality of OTT users in the cross-OTT communication group or OTT servers that the plurality of OTT users separately log in to.

16. The server according to claim 10, wherein the program further includes instructions that, when executed by the processor, cause the server to receive the first cross-OTT service request of the first OTT user by using an OTT server or an OTT interworking platform client.

17. An apparatus, comprising:

a processor; and a non-transitory computer-readable storage medium storing a program to be executed by the processor, the program including instructions that, when executed by the processor, cause the apparatus to:

send a first cross-over the top (OTT) service request to an OTT interworking platform server or an OTT server, wherein:

the first cross-OTT service request carries information about a target user of a second OTT service;

the first cross-OTT service request is a request for adding the target user as a cross-OTT friend;

sending the first cross-OTT service request causes the OTT interworking platform server or the OTT server to perform an interworking processing operation between an OTT user of a first OTT service and the target user of a second OTT service according to the first cross-OTT service request and OTT information of the target user, wherein the interworking processing operation comprises:

sending the first cross-OTT service request to the second OTT service according to the OTT information of the target user; and adding, to a OTT friend list of the first OTT user, the OTT information of the target user;

sending the first cross-OTT service request further causes the OTT interworking platform server or the OTT server to send a friend recommendation to a second OTT user recommending the target user to the second OTT user, according to an association between the first OTT user and the second OTT user, wherein the OTT information of the target user is obtained according to an OTT friend list of the first OTT user, wherein the association is indicated in the OTT friend list of the first OTT user, wherein the second OTT user does not belong to the second OTT service, and during the performing of the interworking processing operation the target user belongs to the second OTT service but does not belong to the first OTT service, and the first OTT user belongs to the first OTT service but does not belong to the second OTT service;

receive, from the OTT interworking platform server or the OTT server, first interworking information of the target user; and display the first interworking information of the target user.

18. The apparatus according to claim 17, wherein the program further includes instructions that, when executed by the processor, cause the apparatus to:

receive a second cross-OTT service request, wherein the second cross-OTT service request is a request for obtaining status information of the target user, a cross-OTT communication request, a request for sharing shared information that is posted by the target user, a request for acquiring OTT information of a friend of the first OTT user, a request for acquiring information about the target user who is allowed to receive shared information sent by the first OTT user, or a request for establishing a cross-OTT communication group;

receive second interworking information of the target user, wherein the second interworking information of the target user is information for recommending the target user, online status information of the target user, the shared information that is posted by the target user, the OTT information of the friend of the first OTT user, the information about a third OTT user who is allowed to receive the shared information sent by the first OTT user, a result of establishing the cross-OTT communication group, or a result of adding the target user; and display the information for recommending the target user, the online status information of the target user, the shared information that is posted by the target user, the OTT information of the friend of the first OTT user, the information about the third OTT user who is allowed to receive the shared information sent by the first OTT user, or information about the cross-OTT communication group.

19. The apparatus according to claim 17, wherein the program further includes instructions that, when executed by the processor, cause the apparatus to:

after displaying the first interworking information of the target user, send acknowledgment information of the target user to the OTT interworking platform server or the OTT server.

* * * * *

UNITED STATES PATENT AND TRADEMARK OFFICE
CERTIFICATE OF CORRECTION

PATENT NO. : 10,735,498 B2
APPLICATION NO. : 15/013693
DATED : August 4, 2020
INVENTOR(S) : Yanmei Yang Page 1 of 1

It is certified that error appears in the above-identified patent and that said Letters Patent is hereby corrected as shown below:

In the Claims

In Column 55, Line 20, Claim 5, delete "the first OTT user;" and insert --the first OTT user; and--.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*